US010896390B1

(12) United States Patent
Duggan et al.

(10) Patent No.: US 10,896,390 B1
(45) Date of Patent: Jan. 19, 2021

(54) MULTIDIRECTIONAL CASCADING GOALS

(71) Applicant: BetterWorks Systems, Inc., Palo Alto, CA (US)

(72) Inventors: Kris Duggan, Palo Alto, CA (US); Ciara Peter, San Francisco, CA (US); Di Wu, East Palo Alto, CA (US); Paul Reeves, San Carlos, CA (US)

(73) Assignee: BetterWorks Systems, Inc., Redwood City, CA (US)

( * ) Notice: Subject to any disclaimer, the term of this patent is extended or adjusted under 35 U.S.C. 154(b) by 855 days.

(21) Appl. No.: 14/799,462

(22) Filed: Jul. 14, 2015

Related U.S. Application Data

(60) Provisional application No. 62/024,418, filed on Jul. 14, 2014.

(51) Int. Cl.
*G06Q 10/06* (2012.01)
(52) U.S. Cl.
CPC .............. *G06Q 10/06311* (2013.01)
(58) Field of Classification Search
CPC .............................................. G06Q 10/06311
See application file for complete search history.

(56) References Cited

U.S. PATENT DOCUMENTS

| 6,732,100 | B1* | 5/2004 | Brodersen | G06F 21/6227 |
| | | | | 707/999.002 |
| 2004/0172320 | A1* | 9/2004 | Spellman | G06Q 10/063114 |
| | | | | 705/7.15 |
| 2009/0037880 | A1* | 2/2009 | Adger, III | G06Q 90/00 |
| | | | | 717/121 |
| 2012/0311044 | A1* | 12/2012 | Beaven | G06Q 10/0637 |
| | | | | 709/204 |
| 2012/0311047 | A1* | 12/2012 | Yokoi | G06Q 10/00 |
| | | | | 709/206 |
| 2015/0081450 | A1* | 3/2015 | Bean | G06Q 30/0269 |
| | | | | 705/14.66 |

FOREIGN PATENT DOCUMENTS

EP 0827091 A2 * 3/1998 ....... G06F 17/30392

OTHER PUBLICATIONS

Bulk Creation of Goals in CRM 2011, https://garethtuckercrm.com/tag/goal/, Jan. 28, 2011 (Year: 2011).*

* cited by examiner

*Primary Examiner* — Nadja N Chong Cruz
(74) *Attorney, Agent, or Firm* — Lee & Hayes, P.C.

(57) ABSTRACT

Bidirectional or multidirectional cascading goals allow goal progress to roll up or downstream multiple levels in an organization. This means that goals from be assigned by higher-level employees to lower-level employees and lower-level employees to higher-level employees. The progress of contributing goals directly modifies the progress of all upward goals to reflect accurate progress of the overarching goal. Goals can be standalone goals, or contribute to other goals. A connection between goals may be made during the goal creation process or after both goals have been created.

20 Claims, 14 Drawing Sheets

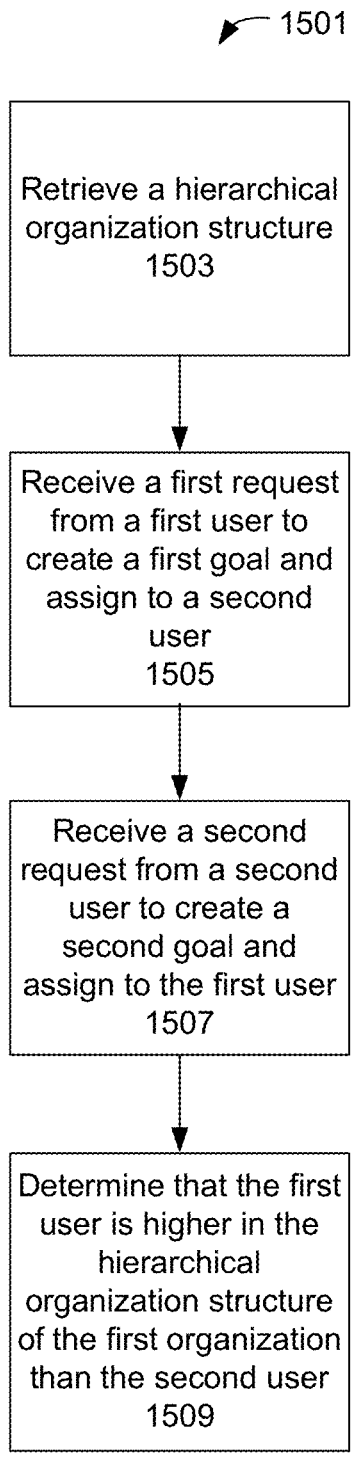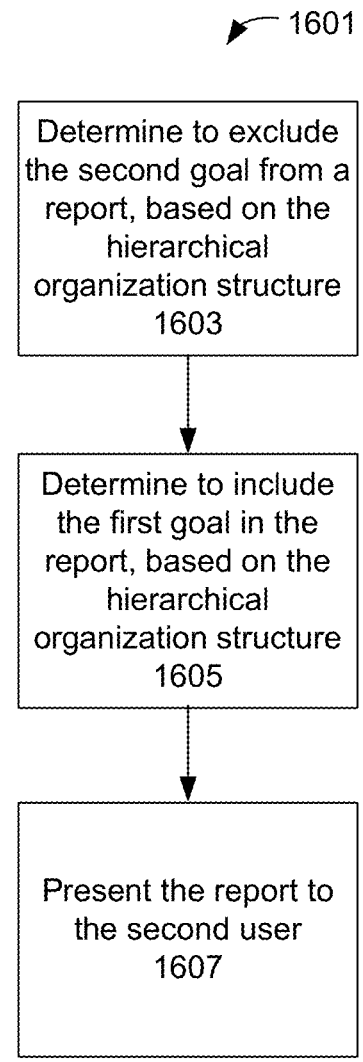
Figure 15
Figure 16

MULTIDIRECTIONAL CASCADING GOALS

CROSS-REFERENCE TO RELATED APPLICATIONS

This patent application claims the benefit of U.S. patent application 62/024,418, filed Jul. 14, 2014, which is incorporated by reference along with all other references cited in this application.

BACKGROUND OF THE INVENTION

This invention relates to the field of software and more specifically to productivity software.

Human productivity and business productivity is an important aspect of modern society, and provides the foundation for the future development and success of our society. The computer revolution and Internet have brought about new techniques of improving people's productivity.

An aspect of productivity is goal or task management, so that a team of people can accomplish an objective in as short a time as possible, as efficiently as possible, and without unnecessary duplication of efforts. Providing a truly effective goal or task management, however, requires a deep understanding of the user's real-world needs. The effectiveness of a goal or task management system is dependent on the system's understanding of the concepts that user wants to track in everyday situations.

In the workplace, different people and teams work on different aspects of a common goal or project. However, people may have different schedules or work in different locations. And some people may work from home. Despite these challenges, team members should be able to work effectively with one another.

It is important that people in the company or team, even if in a different department or level in the organizational chart, are able to view and assist other people of the company or team. A person should be able to view who is helping with their goals, view whose goals they are helping with, assist others with their goals, and also enlist others for help with their goals.

Therefore, there is a need for improved productivity techniques, especially techniques for goal or task management.

BRIEF SUMMARY OF THE INVENTION

In an implementation, a system includes software applying the principles of management by objectives (or MBOs). In 1954, Peter Drucker introduced management by objectives, also known as management by results (or MBRs). Many businesses were quick to adopt this approach. He asserted, "Unless commitment is made, there are only promises and hopes . . . but no plans." Drucker was an advocate of S.M.A.R.T. goals-specific, measurable, achievable/actionable, relevant/realistic and time-related-providing a guide to businesses seeking to understand the best way to write MBOs. The system includes cascading goals, allowing organizations to implement MBR principles.

Bidirectional or multidirectional cascading goals allow goal progress to roll up or downstream multiple levels in an organization. The progress of contributing goals directly modifies the progress of all upward goals to reflect accurate progress of the overarching goal. Goals can be standalone goals, or contribute to other goals. The connection between goals may be made during the goal creation process or after both goals have been created.

A specific implementation of a system of bidirectional or multidirectional cascading goals is by BetterWorks™ Systems, Inc. BetterWorks is a trademark of BetterWorks Systems, Inc. BetterWorks publications (including user guides, white papers, tutorials, videos, training materials, blogs, and others), and other publications about the BetterWorks cascading goals system are incorporated by reference.

Some aspects a multidirectional cascading goal system include: Executives can see how different departments contribute to their goal. Executives and managers can drill down multiple levels to find the source of issues. Individual contributors can see how the work they do contributes to the overall vision. Users can envision true, real-time progress based on contributions from everyone in the organization. The system does not require a top-down approach to goal creation. The system allows individuals to connect their goals to managers or other higher-level goals. The system avoids requiring a top-down approach to goal creation by allowing goals to be created in parallel and connected later. A system or technique of the invention can including any or any combination these aspects. Goals can contain many key results, with different progress calculations applied to each, and progress cascades according to the selected progress mechanism.

Further aspects of a multidirectional cascading goal system include: All goals in the system are open and visible in the organization by default. Depending on the particular implementation, the company or organization can decide to turn on some privacy settings if less transparency is desired. Goals can be private to specific people, specific groups, or any combination of the two. People can assign goals top-down, bottom-up (upwards), or even sideways (e.g., to anyone who is a user of the system). People can sign up to be contributors on other's goals (i.e., bottoms up). Moreover, adding a milestone to another goal creates a contributing goal for any specified recipient. For the cascading goals, all progress is properly calculated and rolled up.

The cascading goal system can be embodied in software, such as desktop, web, or mobile application or tool, software as service, or embedded or integrated as a component of another software application or service. The system can be embodied on multiple platforms at the same time, such as a Web version and smartphone version, and these clients are connected via the Internet or cloud.

In an implementation, a system includes a method for tracking goals including: retrieving from an organization database a hierarchical organization structure of a first organization, the hierarchical organization structure including: a plurality of users of the system; and a plurality of relationships of each user of the plurality of users to other users of the plurality of users; receiving a first request over the Internet from a first user of the system to create a first goal and to assign the first goal to a second user, where a first owner of the first goal includes the first user and a first assignee of the first goal includes the second user; receiving a second request over the Internet from the second user of the system to create a second goal and to assign the second goal to the first user, where a second owner of the first goal includes the second user and a second assignee of the second goal includes the first user; determining based on the information from the organization database that the first user is higher in the hierarchical organization structure of the first organization than the second user; allowing the first and second requests to be stored in the system, while disregarding that the first user is higher in the hierarchical organization structure of the first organization than the second user;

and storing the first and second goals in a goal database associated with the first organization.

The system includes generating a first report for the first user including: determining to include the second goal in the first report, based on the hierarchical organization structure; and presenting the first report to the first user. The system includes where the generating a first report for the first user further includes: determining to include the first goal in the first report, based on the hierarchical organization structure of the first goal. The system includes: generating a second report for the second user including: determining to exclude the second goal from the second report, based on the hierarchical organization structure; and presenting the second report to the second user.

In various implementations, the system includes where the generating a second report for the second user further includes determining to include the first goal in the second report, based on the hierarchical organization structure. The system includes allowing the first user to modify the assignment of the first goal to a third user. The system includes allowing the second user to modify the assignment of the first goal to a third user. The system includes for a third user of the system associated with a second organization, disallowing access to first and second goals.

The system includes determining the first user is more than one level higher in the hierarchical organization structure of the first organization than the second user. The system includes receiving a third request from a third user to view the first goal, where the third user is lower in the hierarchical organization structure of the first organization than the second user; and presenting to the third user the first goal. The system includes receiving a third request from a third user to view the first goal, where the third user is lower in the hierarchical organization structure of the first organization than the first and second user; and presenting to the third user the first goal. The system includes receiving a third request from a third user to view the first goal, where the third user is lower in the hierarchical organization structure of the first organization than the first user and higher in the hierarchical organization structure of the organization than the second user; and presenting to the third user the first goal.

In an implementation, the system includes: an organization database including a hierarchical organization structure of a first organization, the hierarchical organization structure including: a plurality of users of the system; and a plurality of relationships of each user of the plurality of users to other users of the plurality of users; a goals database including a plurality of goals stored in the system, where each goal of the plurality of goals includes a goal owner and a goal assignee; a user interface component, accessible over an internet connection, where the user interface component: receives a first computer transmission over the Internet from a first user of the system to create a first goal and to assign the first goal to a second user, where a first owner of the first goal includes the first user and a first assignee of the first goal includes the second user; and receives a first computer transmission over the Internet from the second user of the system to create a second goal and to assign the second goal to the first user, where a second owner of the first goal includes the second user and a second assignee of the second goal includes the first user; and a goals manager component, coupled to the goals database and the organization database, where the goals manager component stores, adds, and updates the goals database and determines based on the information from the organization database that the first user is higher in the hierarchical organization structure of the first organization than the second user; allows the first and second requests to be stored in the system, while disregarding that the first user is higher in the hierarchical organization structure of the first organization than the second user; and instructing the goal database to store the first and second goals associated with the first organization.

The system includes a reporting component, coupled to the user interface component, that generates reports for users of the system including: for the first user, generating a first report including identifying one or more goals associated with the first user from the goals database, where each goal of the one or more goals includes the first user as a goal owner or a goal assignee. The reporting component further includes for the second user generating a second report including identifying the first goal and disallowing the first goal from being included in the second report based on the hierarchical organization structure. The system includes where the first goal is a milestone type goal, including at least two milestone items, and each milestone item is required to be completed before the first goal is completed. The system includes where the first goal is a metric type goal, including a numerical value and unit type, and the numerical value needs to be met before the first goal is completed. The system includes a social component allowing the first user to cheer the second goal, but not the first goal. The system includes where the social component allows the second first user to cheer the first goal, but not the second goal. The system includes a social component allowing the first user to comment on the second goal.

Other objects, features, and advantages of the invention will become apparent upon consideration of the following detailed description and the accompanying drawings, in which like reference designations represent like features throughout the figures.

BRIEF DESCRIPTION OF THE DRAWINGS

FIG. 15 shows an example flow for creating goals in a goal tracking system.

FIG. 16 shows an example flow for generating reports in a goal tracking system.

DETAILED DESCRIPTION OF THE INVENTION

Figure 1:
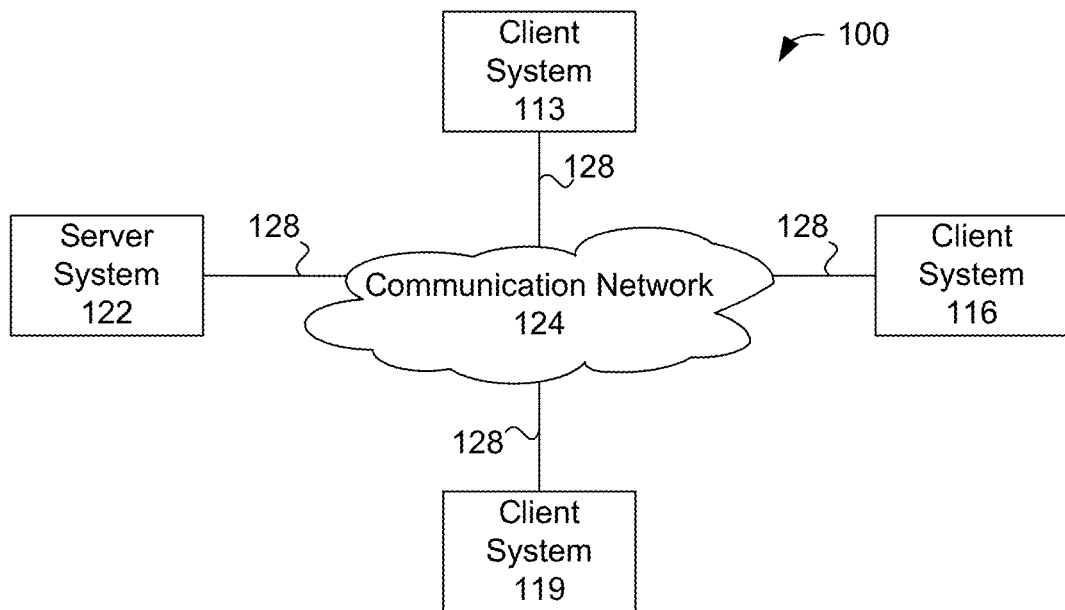
FIG. 1 shows a simplified block diagram of a client-server system and network in which an embodiment of the invention may be implemented.

A system allows users to create goals and provide insight on the goals for users. The system provides five features that allow users to create better goals and achieve these goals, such as through applying Goal Science™ principles from BetterWorks Systems, Inc.

(1) Connected

Businesses embracing goal science best practices can keep everyone working well together by making sure goals are not established in isolation. A company committed to goal setting will identify someone who can help educate all teams, track progress, and make the necessary changes to keep processes on track. This can be the chief operating officer or someone else in a leadership position.

Goal setting may not be perfect from the start and there will be naysayers, so having someone oversee the process is important. Goals should be drafted and owned by individuals, reviewed by managers, and tracked by both. In contrast to MBO-model goals that are often only vertically aligned—visible to a manager and his or her direct reports—to be truly connected, all goals must be visible, aligned, and owned. Making goals visible online is a necessary condition for consensus and alignment in an organization.

To be aligned, goals must be connected in three different ways:

(a) Vertical—An individual's goals connect to (and do not conflict with) a manager's goals.

(b) Company/Mission—An individual can clearly see how his or her goals connect to the company goals and mission, making goals more meaningful.

(c) Horizontal—An individual's goals connect (and do not conflict) across teams. Who owns what goals is also important to achievement. Not all goals should come from corporate. Google Ventures' partner Rick Klau suggests more than half of goals should originate from employees. Behavioral science expert, Gary Latham found stakeholders participating in goal setting do better. About Kurt Lewin's student, Alex Bavelas, he wrote, "By securing employee participation in decision making, previously unattainable goals were reached by those workers." Individuals will achieve more when they help shape their own goals and connect them to an internal sense of what they can do to make the biggest impact for the business.

(2) Supported

In addition to connecting goals across an organization, employees will make more progress on goals when they feel like they are part of a supportive community. Working as a team to do something important in a positive, social team environment helps make work engaging, meaningful, and fulfilling. Intrinsic, or internal, motivation to be a better person can be more powerful than extrinsic, or external, motivation such as getting praise or a bonus at work.

When researchers Teresa Amabile and Steven J. Kramer were looking at the best way to drive innovative work inside organizations, they analyzed diaries kept by knowledge workers and discovered the progress principle: Of all the things that can boost emotions, motivation, and perceptions during a workday, the single most important is making progress in meaningful work. They realized, "If you are a manager, the progress principle holds clear implications for where to focus your efforts. It suggests that you have more influence than you may realize over employees' well-being, motivation, and creative output. Knowing what serves to catalyze and nourish progress—and what does the opposite—turns out to be the key to effectively managing people and their work."

When teams and organizations take time to celebrate individual accomplishments, no matter how small, they can drive achievement. Consider the success of the Positive Coaching Alliance, a national non-profit developing 'Better Athletes, Better People' by working to provide all youth and high school athletes a positive, character-building youth sports experience. More than five million young athletes have benefited from improving themselves, their teammates, and the game as a whole as they positively pursue sports and life lessons.

Positive psychology is an umbrella term for the study of positive emotions, positive character traits, and enabling institutions. In 2000, Dr. Martin E. P. Seligman founded the field of Positive Psychology on the belief that people want more than an end to suffering. People want to lead meaningful and fulfilling lives, to cultivate what is best within themselves, to enhance their experiences of love, work, and play. When supported, it is amazing what individuals can achieve.

(3) Adaptable

In contrast to traditional, yearly goal-setting processes that inform annual performance reviews, modern goal-setting processes strive to be dynamic and agile. Goals should reflect fast-paced, ever-changing global work environments, enabling workers to shift focus to more important goals. Rather than a set-it-and-forget-it approach, the recommended approach to goal science encourages individuals to modify, archive, and add new goals frequently and continuously.

The reasons for adaptation are summed up well by the author of The 7 Habits of Highly Effective People, Stephen Covey, "If the ladder is not leaning against the right wall, every step we take just gets us to the wrong place faster." In short, it is better to be working toward a moving target heading in the right direction than making progress in a direction that an individual knows is wrong.

Because they can and should be modified regularly, goals do not have to be perfectly defined when they are created. For imperfect goals such as "launch product X," individuals may only know three real milestones at the start, yet anticipate five to ten more coming. When each milestone can be defined-whether midway through or near the end of a quarter-goal science best practices advocate editing and refining the goal, but only when goals are ready. By always staying focused on how to refine goals, employees can be sure they are getting the right work done now.

(4) Progress Based

The quantified self-movement—with activity trackers such as FitBit™, Jawbone™, and others—has proven that people want to get frequent, measurable, visual, and graphical feedback. It has also shown that when individuals do get feedback, it helps shape behavior to make more consistent progress toward goals.

Weekly check-ins as a goal science best practice create a culture of frequent feedback around progress. Research conducted by Dr. Gail Matthews discovered "people who wrote down their goals, shared this information with a friend, and sent weekly updates to that friend were on average thirty-three percent more successful in accomplishing their stated goals than those who merely formulated goals."

Progress has been shown to be a powerful force in motivating employees to do their best. Studies including the one by Amabile and Kramer uncovering the progress principle demonstrate the progress loop is self-reinforcing. They wrote: "The more frequently people experience that sense of progress, the more likely they are to be creatively productive in the long run. Whether they are trying to solve a major scientific mystery or simply produce a high-quality product or service, everyday progress—even a small win—can make all the difference in how they feel and perform."

Recent studies also show that framing goals positively leads to greater achievement. Behavioral scientist Latham revealed, "A negatively framed goal ('Try not to miss answering more than 3 of 15 anagrams.') led to worse performance than either a positively framed goal ("Try to answer 12 out of these 15 anagrams.") or a do-your-best goal."

By continually driving a virtuous cycle of progress and at the same time breaking negative cycles, employees can achieve more success. Goal science best practices include updating goals frequently so small wins are continually captured. They also include creating goals with appropriate goal resolution, for example, approximately one milestone every one-to-two weeks.

(5) Aspirational

Every employee should aim high when setting goals because stretch goals also promote greater achievement. Psychologists Edwin Locke and Gary Latham wrote: "Studies have shown that specific and ambitious goals lead to a higher level of performance than easy or general goals. As long as the individual accepts the goal, has the ability to attain it, and does not have conflicting goals, there is a positive linear relationship between goal difficulty and task performance."

For example, some goals can be more difficult to achieve than others. To make sure everyone works towards completing goals, irrespective of the difficulties of each goal, goal setting and tracking should not be directly tied to compensation. Goals may be used as inputs to inform an annual performance review about the tasks an individual is working on, however goal setting progress should in no way be connected to annual performance review results. This helps to separate goal setting to compensation, which would otherwise potentially lead to gaming the system. Employees want to achieve one-hundred percent, so some will lower targets as they near a review cycle. Moreover, achieving one-hundred percent on every goal may mean employees are not raising the bar high enough during the goal setting process.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a standalone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
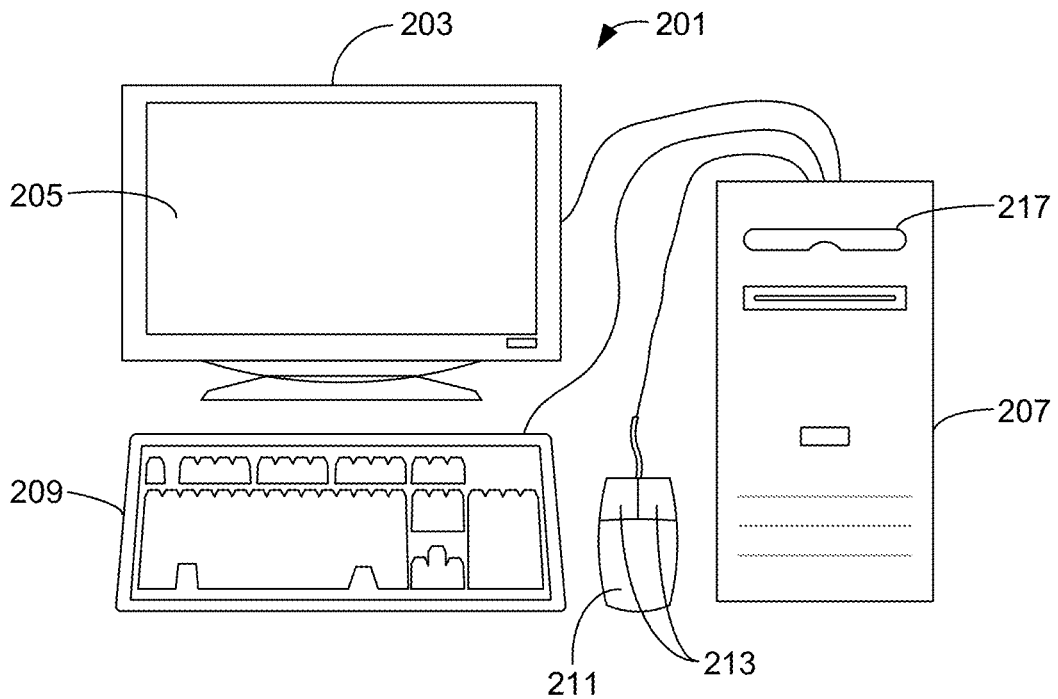
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 5), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 4, Google Nexus 7, or Google Nexus 10), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
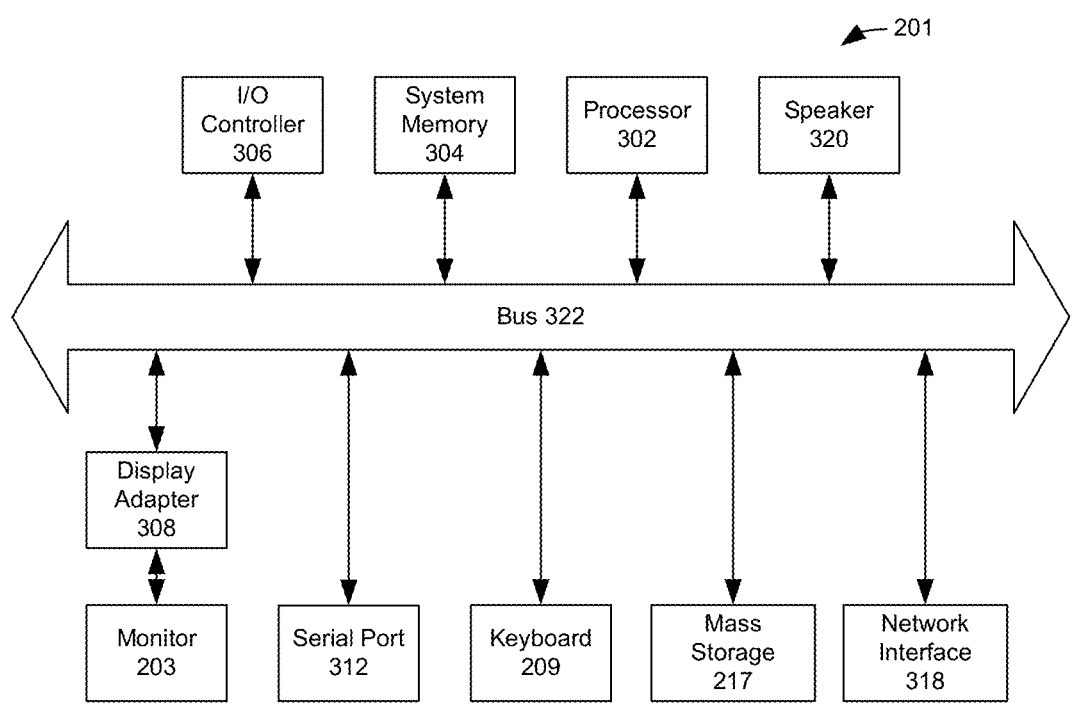
FIG. 3 shows a system block diagram of a client computer system used to execute an application program according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1×RDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk. Some specific flows for determining a technique of the invention are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figure 4:
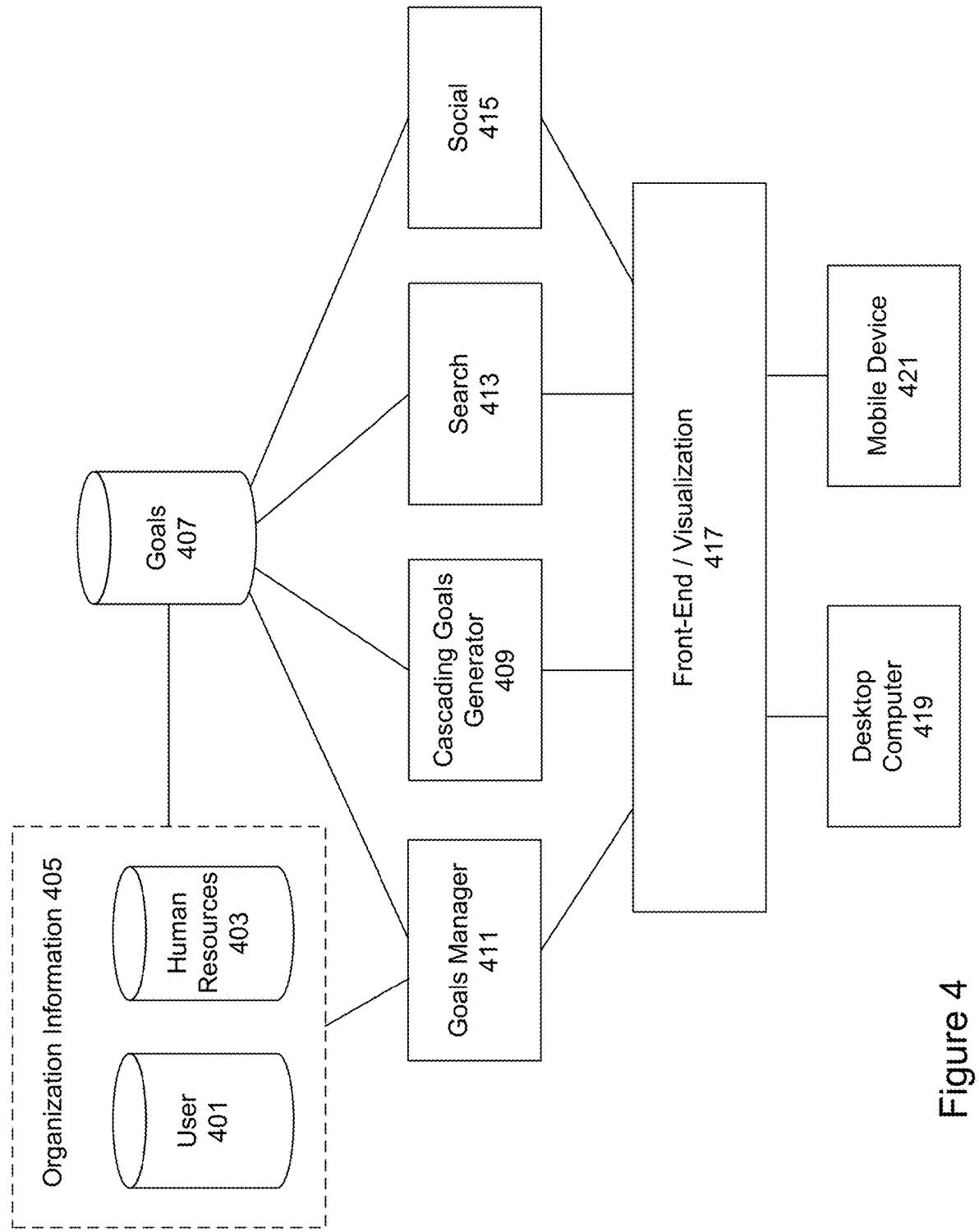
FIG. 4 shows a block diagram of a system including a cascading goal application tool.

FIG. 4 shows a block diagram of a system including a cascading goal application tool. The system includes a user database 401 and a human resources database 403. These are organization information sources 405 used by the system to provide context and other advanced functionality for the system's goals features. The user database includes a profile for each user in an organization. Some information the user database can include for a given user are their full-name, e-mail address, position in company, office location, home address, or any combination of these. The human resources database 403 includes an organization chart of the organization. The organization chart is a diagram that shows the structure of an organization and the relationships and relative ranks of its users and their positions/jobs. A goals database 407 includes one or more goals the organization. The database also includes how the goals are interconnected among each other (e.g., subgoals, parent goals, or other relationships).

In an implementation, users other than the system administrator or human resources administrator are disallowed from adding other new users to the system and limited in their ability to modify information about each user of the system. For example, this restricts most users from modifying their account details (e.g., e-mail address, position in company, name, or other) while allowing the user to add, remove, or modify goals in the system. This helps the system maintain the accuracy of data stored in the system, as well as provide a centralized method to change or remove users as an organization requires.

In an implementation, the organization information is provided to the system by a user. Generally, a system administrator, a human resources team, manager, or other staffing related person is responsible for maintaining such information for an organization. These persons or others under their direction can enter this information into the system. In another implementation, the system interfaces with an organization's existing system to determine the organization information. For example, if the organization uses human resources software, the system can connect to human resources software, to determine user and other human resources related information, without needing manual entry by users.

In an implementation, information stored in the user database is encrypted to maintain security in the system. This includes encrypting the user database or encrypting user database information while it is in transit (e.g., transferred over a network, transferred between components of the system, or other). This is because access to information in the system is restricted (e.g., the system is not a completely open system to non-users). The system maintains confidentiality of information stored by users of the system, making sure that only users associated with a particular organization's account can view information stored in the system for that organization.

A cascading goals generation module 409 is used to determine how goals in the system relate to one another. Although the information associated with each goal is stored in the goals database 407, the information stored in the goals database is in a flat structure (e.g., each goal includes only its immediate contributing goal, parent goal one-degree of separation away, or both). The cascading goals generation module determines an organization's entire goal tree or any subsection of the organization's goal tree (e.g., a goal's parent or contributing goal two or more degrees of separation away). This is useful in the system to allow users to see how one goal is related to another and diagnose how progress on one or two goals is impeding progress on other, seemingly unrelated goals (e.g., goals that are not directly coupled to each other).

A goals manager module 411 is used to add, modify, or remove goals in the system. For example, the module receives modifications for an existing goal of the system. This module is responsible for identifying in the goals database 407 the existing goal and any changes and information needed from the user database 401 to make the changes. The module then executes the changes in the respective databases. A search module 413 allows users to search by various criteria as stored in the system. Some of these include searches by user (by owner, user assigned to, team, or other), goal name, due date, or other criteria.

A social module 415 is used to allow users to comment on a goal by selecting one or more status indicators with the goal. This can include a comment feature, to provide text, voice, video or other feedback for a given goal. In an implementation, the system includes a cheer and a nudge status indicator. This is a valuable tool, to promote community and accountability within an organization. For example, if a goal is nearing completion, users can indicate a cheer, meaning good progress is being made. On the other hand, if a goal has not had progress, users can indicate a nudge, meaning that more progress needs to be made.

A front-end or visualization module 417 is used to create visual representation of the information stored in the system. The front-end module is an intelligent module that adapts the visual representation in different formats depending on how a user is accessing the system. The front-end module 417 is coupled to a network (e.g., internet, intranet, or other networks) which users connect onto using desktops 419, mobile devices 421, or other devices. The system is adaptive meaning that it can accommodate many devices of different capabilities. For example, the module adapts to smaller screen sizes (e.g., desktop, smartphone, tablet, laptop, or other sizes) by formatting and presenting more or less information based on the screen size. Although a larger screen size can accommodate more information at once to present to a user, the system is designed to display information as needed to the user. This means that the system selects information to display to the user, depending on the functionality and features of the system the user is interacting with at a given time.

Figure 5:
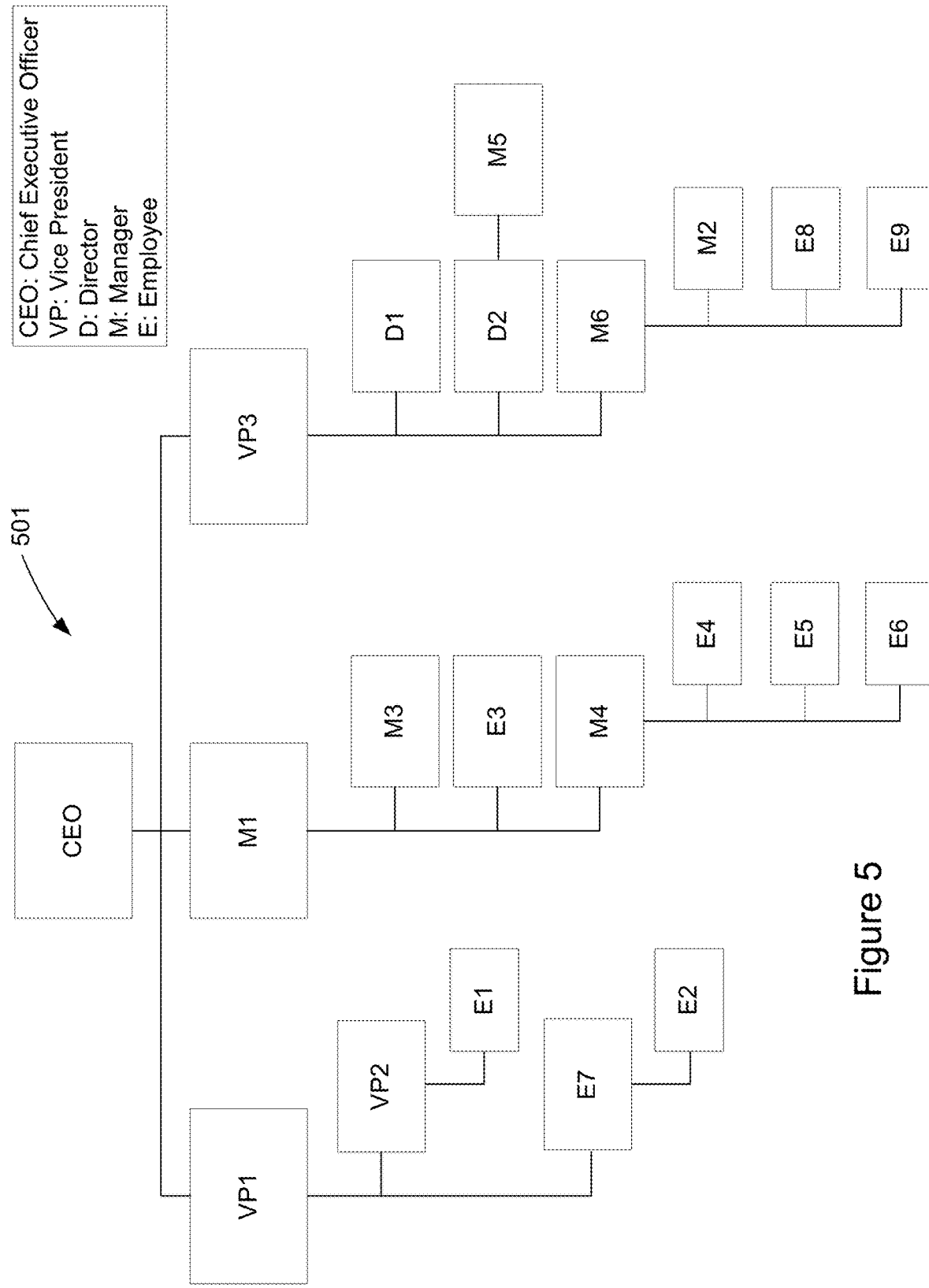
FIG. 5 shows an organizational chart for a company using the cascading goal application tool.

FIG. 5 shows an example of an organizational chart 501 (or org chart) of an organization. The organizational chart is hierarchical, meaning that those at the top of the chart generally occupy higher positions in the organization (i.e., include more persons reporting to them) than those at the lower end. For example, three employees (E4, E5, and E6) report directly to M4 according to the organization chart. M4 reports directly to M1, while E4, E5, and E6 report indirectly to M1. This means that those at the top are often responsible for the control, direction, and execution of goals for the organization.

In an implementation, the system operates independently of an organizational structure of a company or organization. This implementation can be considered a flat or single-level implementation. Every user in the system is at the same level with respect to each other, and this is reflected in the user database. For example, a worker who is five levels down the organizational chart from the CEO would be, in the cascading goal system, have a user account that has same privileges and capabilities as CEO's user account.

In another implementation, the system includes a limited hierarchical information regarding the organizational structure of the company. The users database has some limited information about the organization. Some user accounts in the system will have certain privileges or capabilities other user accounts do not.

As specific example, each user account can include information about that user's direct manager. Then, the user's manager can have specific capabilities with respect to that user that other users do not. An example is that a user can create a private goal in the goal database. Only the user and the user's manager will be able to see the private goal, and other users will not be able to access or view.

In another implementation, the system includes complete hierarchical information regarding the organizational structure of the company. The entire organizational chart is reflected in the users database. Each level can have different privileges than other levels. Typically, users at a higher level have more capabilities and privileges users at lower levels.

Interfaces to the system can include keyboard and mouse, touch, face and eye tracking input (e.g., Samsung Smart Scroll), motion sensing input (e.g., Microsoft Kinect™, Sony Move™, or Nintendo Wii™), audio, or visual, or any combination of these. For example, a voice or natural language interface such as Apple's Siri™ or Google's Google Now™ can be used to update progress toward a goal. With a natural language interface, the user can use natural language user interface to interact with the system using their voice. The user can answer questions, make recommendations, and perform actions.

Figure 6:
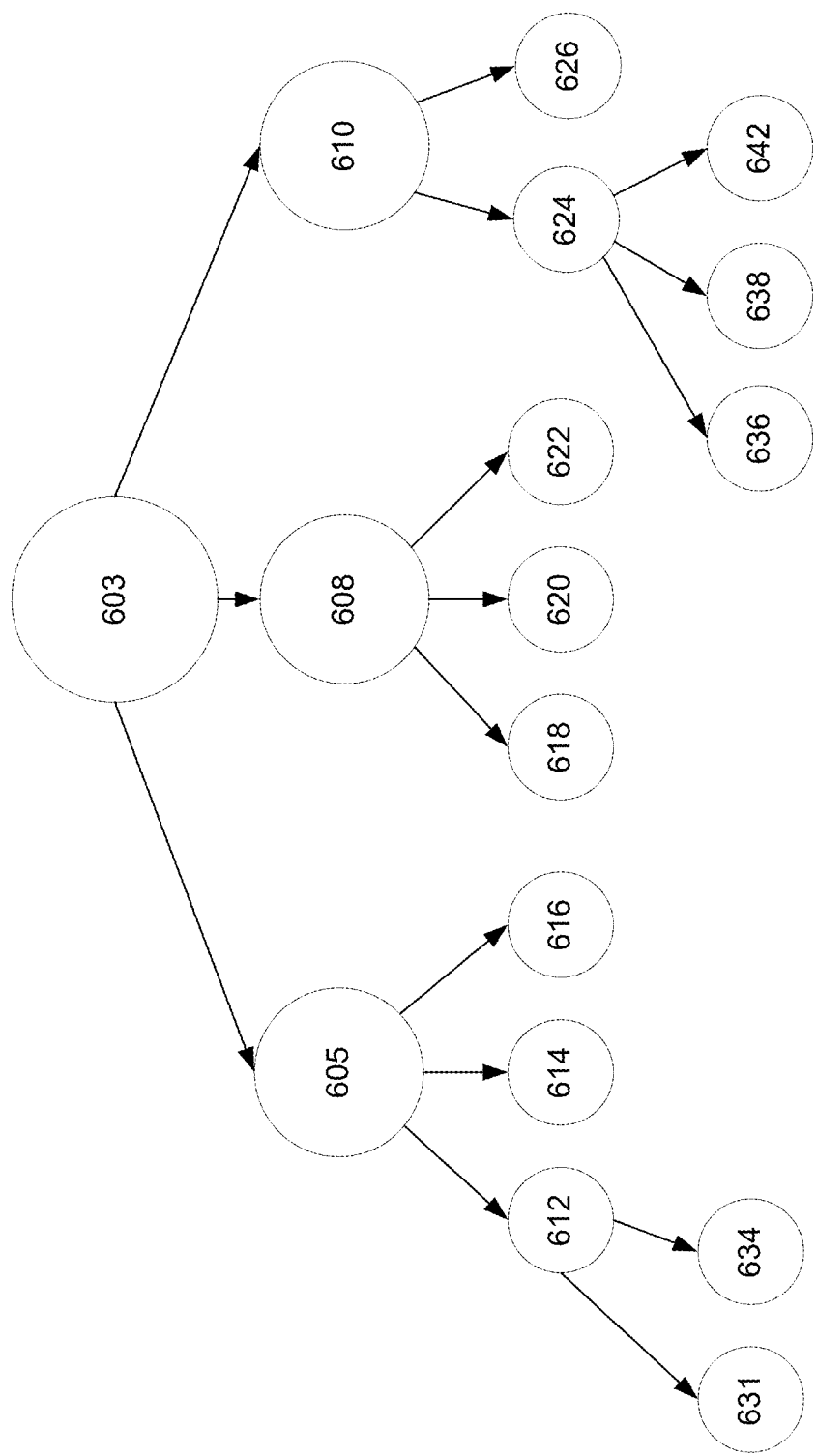
FIG. 6 shows a tree of cascading goals, where the goals are assigned according to a top-down approach only.

FIG. 6 shows a tree of cascading goals, where the goals are assigned according to atop-down approach only. In this tree, goals (represented by circles) flow from the top of the tree to the bottom (represented by arrows). This means that higher-level employees (or superiors) can add goals for lower-level employees, but not vice versa. For example, a goal 603 is subdivided into goals 605, 608, and 610. Goal 603 can be a goal created by someone higher up in an organization (e.g., CEO created goal) while goal 605 is created by someone in a mid-level position in the organization (e.g., manager created goal). The cascading goals tree is stored in the goals database.

In an implementation, goals can be conceptualized as containers. Each goal is a container including one or more progress inputs, as described in greater detail elsewhere in this application. These progress indicators are used to determine the progression of its associated container/goal. For example, a specific container can have a parent goal, child goals, or a combination of these. Some classifications of goals (or progress inputs) include:

Parent goal: A goal that has contributing goals. It may also have a parent.

Contributing goal (or subgoal): Synonymous with child goal, a goal with a parent. May have contributing goals of its own.

Progress of contributing goals directly increases or decreases progress of the parent goal. Every contributing goal represents an element of the parent goal. This means that the goals created at the top of the tree are divided into subgoals, such as goal 603 divided into subgoals (or contributing goals) 605, 608, and 610. The parents of goals 605, 608, and 610 is goal 603. Usually in an organization, this would mean that a higher-level position employee has created new goals and assigned these goals to lower level position employee.

Figure 7:
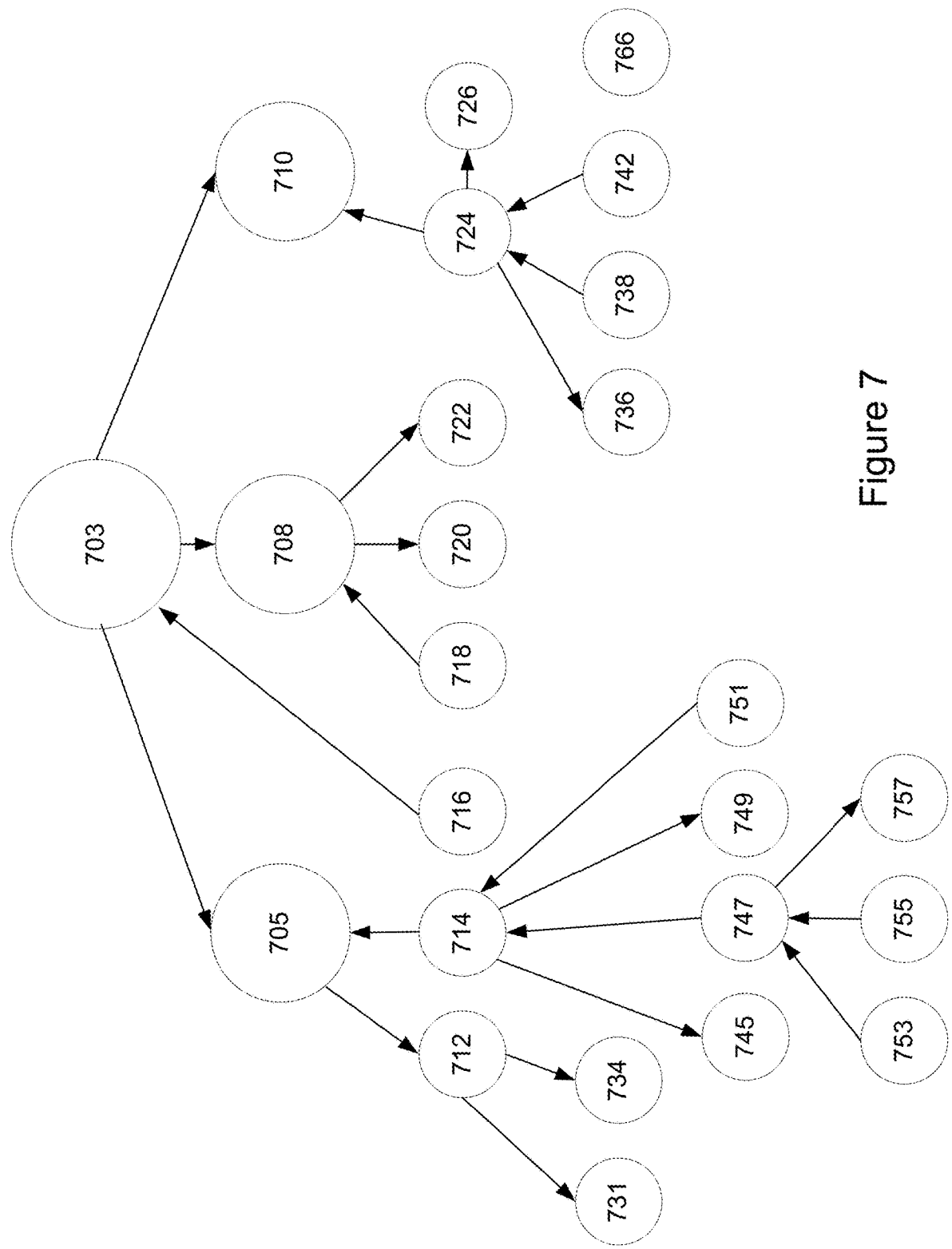
FIG. 7 shows a tree of cascading goal, where the goals are assigned according to top-down, bottom-up, and vertical approaches.

FIG. 7 shows a tree of cascading goals, where the goals are assigned according to top-down (e.g., 703 to 708), bottom-up (718 to 708), sideways (e.g., 724 to 726), or diagonal approaches in an organization. As compared to the top-down approach described in FIG. 6, the system allows additional relationships between goals to be represented in the system. This goal tree does not necessarily need to reflect the internal organizational structure of the organization. For example, the creator or assignee of goal 703 does not necessarily need to be a person at the top of the organization's organizational chart (e.g., CEO).

An example relationship is parent goal 708 that includes contributor goal 722 that was created by the owner of the parent goal 708. However, another person different than the owner created contributor goal 718. Although the person did not create the parent goal 708, they are allowed to link their contributor goal to the parent goal 708. This can happen in an organization when a user views another person's owned goal and wants to contribute to its completion. For example, sometimes a person has worked previously on a similar project and recognizes certain requirements that the owner of the goal did not. To assist in the completion of the owner's goal, the user can add a contributor goal to the owner's goal.

In another example, users with more than one level of separation in an organization's organization chart can assign goals to each other. For example, goal 716 is created by a manager. In the organization's organizational chart, the manager directly reports to a vice president that in turn directly reports to a CEO. However, the system allows the manager to create goal 716 and assign it to the CEO. Once assigned the goal, the CEO can choose whether to complete the goal themselves, divide the goal into further goals, or assign the goal to another person.

In an implementation, the system allows at most one parent goal for each goal. This is because each goal contributes to the completion of at most one other goal in the system. If a user attempts to create a goal with more than one parent, the system disallows the user from doing so (e.g., displays an error message, does not record the goal, generates an alert for other users, or other methods). In another implementation, the system allows more than one parent goal for a goal. This means that the completion of one goal contributes to the completion of two or more parent goals.

In an implementation, the system supports unattached goals. This means the goal (e.g., goal 766) has no parent goal. For example, FIG. 7 shows goal 766 that is unattached to other goals (e.g., it has no contributor or parent goals). This occurs in real-life situation where a goal needs to be accomplished, but users of the system have not determined how it will fit with the rest of an organization's goals when the goal is created. This is a convenient method for the organization to make note of the goal, until its proper place is determined.

In an implementation, goals can be metric type, milestone type, or both. A first type of goal is a metric type and a second type of goal is a milestone type. For metric type goals, the progress represents true value, as contributions to completing the goal are measured by the same unit. For milestone type goals, contributions are equally weighted.

For the metric type goal, the goal is associated with an initial numerical value, target numerical value, and unit. The initial numerical value is the value where the system starts tracking completion to the goal. Usually this would be 0, since most goals will have no progress when they are initially entered into the system. The system is flexible in tracking different types of units. A common unit is financial (e.g., dollars). Other units can be used in different situations (e.g., items, calls, customers, clients). An example of a metric type goal is "Get 10 meetings from list of 50 targeted, key accounts." This goal requires users to review a client list of the organization and setup meetings with 10 of 50 of key accounts in the organization. When the goal is setup, the creator initiates the goal with an initial numerical value of 0 (e.g., no accounts or meeting have been setup yet), target numerical value of 10, and unit of meetings.

For the milestone type goal, two or more steps (or subgoals) are created that represent progress within the goal. An example of a milestone goal is "Ship a new add-on product in Q2." Within this goal can be the milestones of "Deliver code to QA" and "Test and certify product as ready for release."

In an implementation, if a parent of a contributor goal is a milestone based goal, the contributing goal represents one of its milestones. In an implementation, all milestones on a goal are equally weighted. This means that the completion of one of the contributor goal shows the same amount of progress towards completion of the parent goal as another contributor goal to the parent goal. This allows users a quick at a glance method to determine how much progress has been made in a parent goal. In another implementation, users can set in the system specific values of how much each contributor goal contributes to a parent goal. This can be represented as an integer or other value, such as numbers on a scale of 100. This is useful where some goals take longer time or require more effort than others to complete.

In an implementation, if a parent goal is metric based, the contributing goal will represent a portion of the current value. Metric based goals can exceed 100 percent, but milestone based goals can not. Here are some examples of milestone goals:

(1) Goal A is a milestone based goal that contains 3 milestones. Goal B is a contributing goal if parent goal A, which means it represents one of goal A's milestones. If goal B is at 50 percent, and goal A has no additional progress, goal A's overall progress will be 17 percent (includes rounding to closest integer).

(2) Goal A is a metric based goal with a target value of 300 apples. Each contributor (goals B, C, and D) is assigned 100 apples. Goal B assigns another goal (goal E) to contribute to his, and he has assigned 50 of his 100 apples to the contributor. Now, there are three levels of goal hierarchy. Goal E has a standout quarter and sells 800 apples. Goal C has sold 50 of his 100 apples and goal D has sold no apples. The system represents the progress as: goal A: 283 percent; goal B: 800 percent; goal C: 50 percent; goal D: 0 percent; and goal E: 1600 percent.

In an implementation, the system includes a default goal type of metric. This allows a goal's progress to be calculated by the average progress of its contributions.

In an implementation, if a parent of a contributor goal is a milestone and metric based goal, only progress using the same unit will cascade upward to affect the parent goal. However, the contributing goals will still be able to add milestones to their goals which are peers to that contributing metric. Their goal's progress will still be calculated based on an average, but only the corresponding unit value will cascade upward to the parents which are also responsible for a metric unit key result with the same unit. For example, a first goal includes a "contacts" unit type, a second goal includes a "contacts" unit type and a third goal includes a "dollars" unit type. Assuming the second and third goals are contributing goals to the first goal, only progress of the second goal will affect the progress of the first goals "contacts" unit type, since they share the same unit type. However, the third goal will be considered a milestone of the first goal whose progress will be based on an average.

The system includes a variety of features for goals:

(1) Flexible assigning of goals. Goals can be cascaded through unlimited levels at an organization.

(2) Goal types can be combined. This means that metric goal progress can roll up to a milestone based goal's progress.

(3) Tracking goals. A milestone on my goal becomes a goal for the contributor. Goals also share the same name.

(4) Notifications. The system provides a variety of methods of notifying users on their goals. E-mail, push notifications (e.g., through a mobile device), and in-app recommendations are crafted by the system using a variety of factors. Some of these factors include: cascading relationship, reporting relationship, parent goal due date, milestone or cascaded goal due date, goal progress, or a combination of any of these factors.

(5) Creation of goals. The child goal and parent goal may be created in parallel and later connected or cascaded. Goal creation does not have to occur in a top down format.

(6) Various goal directions. The goal connection can be made in a top down or bottom up format, to support concurrent planning and goal creation. The connection of two goals can be made by the parent goal owner or the contributor.

(7) Open cascading goals. The cascading goal model is open. Anyone at a company can contribute to anyone else at the company's goal. Goal relationships are not limited by reporting structure. This means that the system is generally agnostic to an organization's internal people hierarchy and organizational structure.

(8) Adaptive options for assigning goals. Progress can be shared between contributors and a parent goal owner. The owner of the parent goal can be responsible for some milestones, while additional contributors can be responsible for others.

Figure 8:
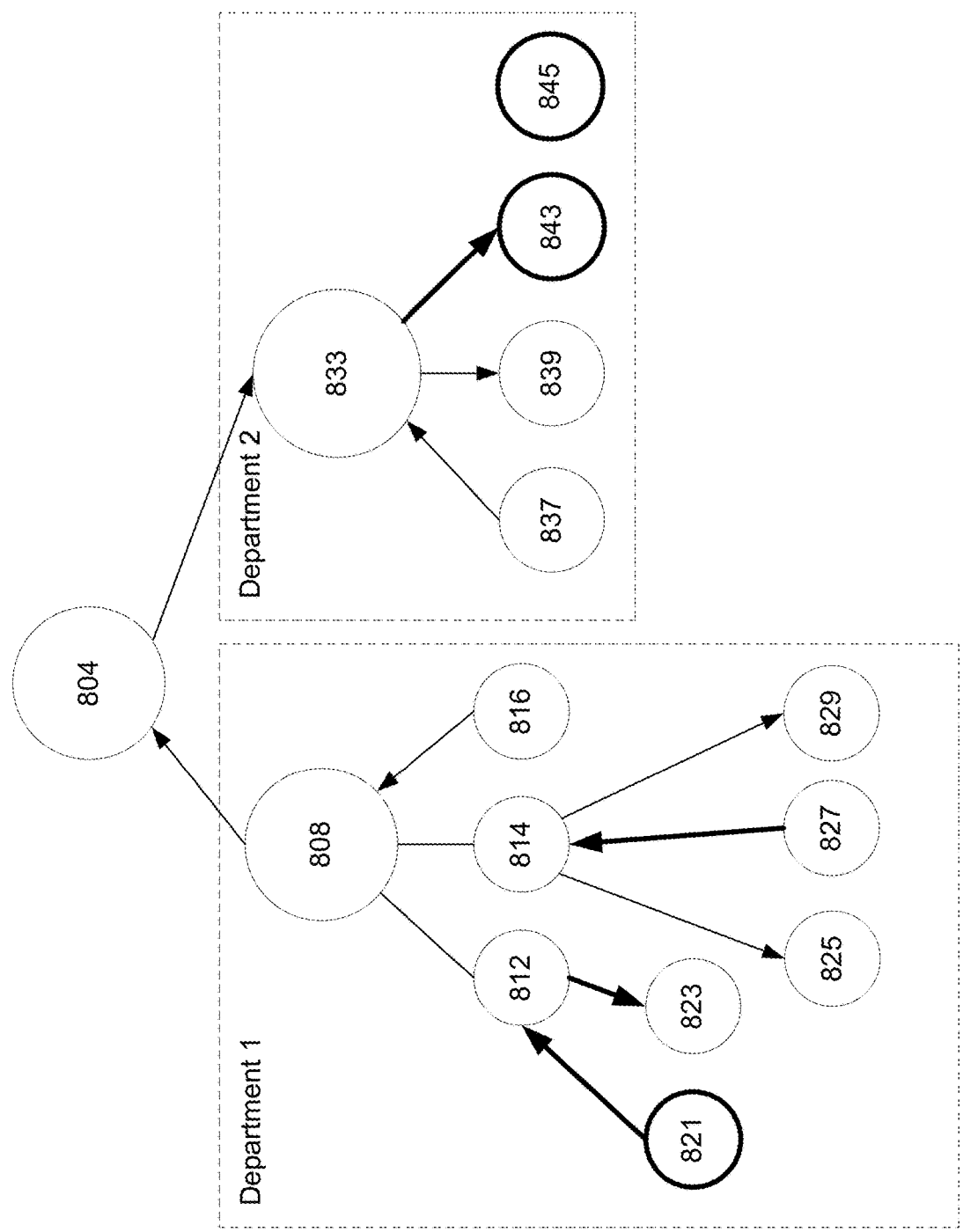
FIG. 8 shows goals for two departments of a company.
Figure 9C:
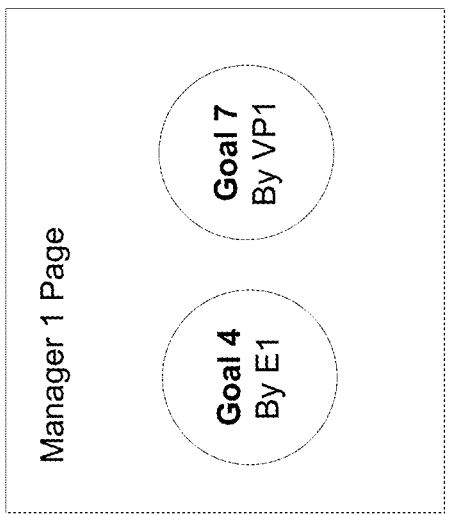
FIGS. 9A-9F show user screens for different users in the organization at different levels of the organizational chart.
Figure 9F:
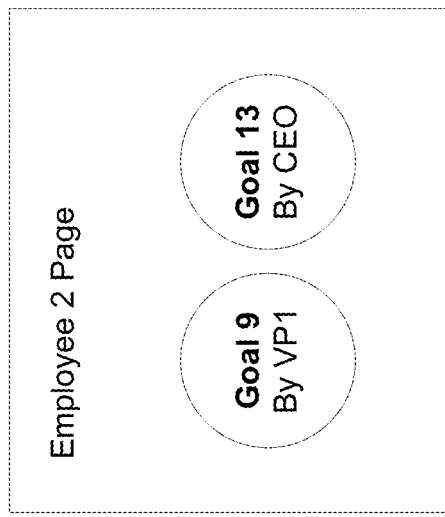
Figure 9B:
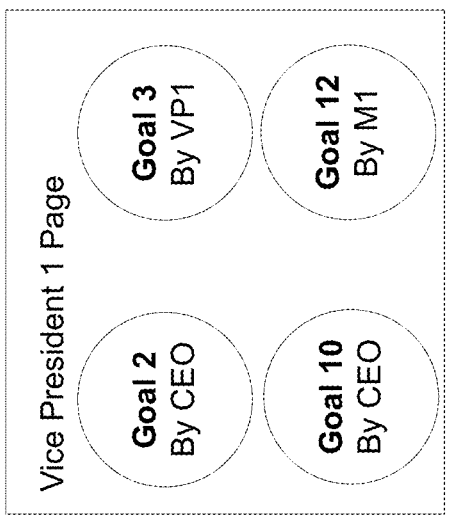
Figure 9E:
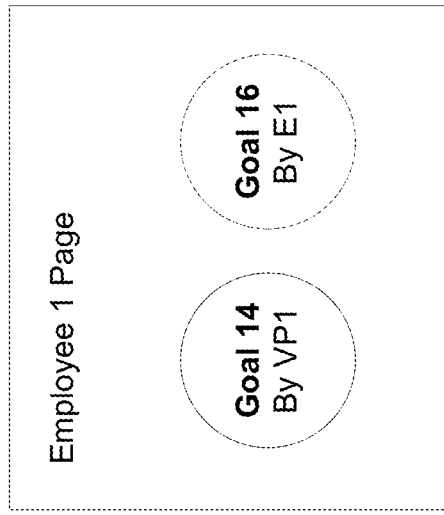
Figure 9A:
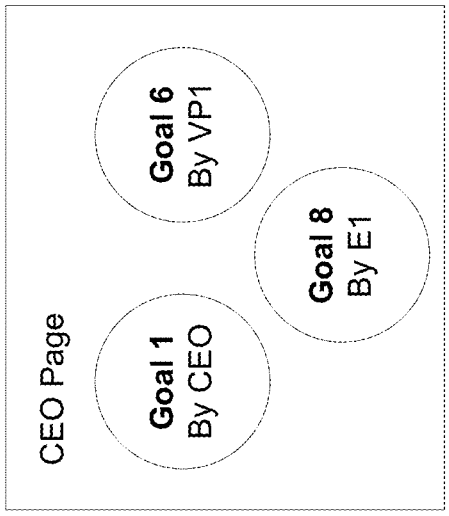
Figure 9D:
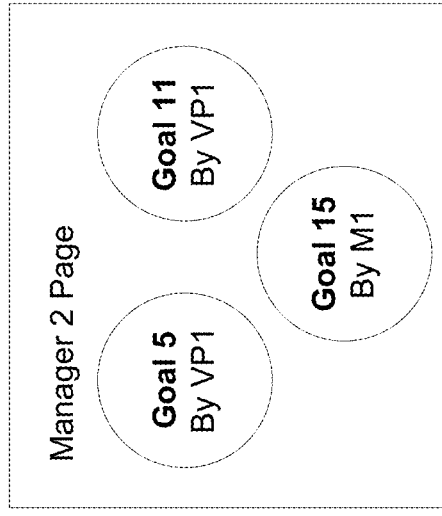

FIG. 8 shows goals for two departments of a company. Even though two different departments are shown here, the both contribute to the completion of goal 804. For example, if goal 804 represents completion of a smartphone application, department 1 represents a database team while department 2 represents a user-interface development team. Although each team is working on different aspects of completing the application, they are working towards the completion of the same application. Some sample use cases of the system include:

(1) User adds goal and assigns goal. For example, this is shown with contributing goal 821. A user, who is not the owner of parent goal 812, has determined the contributing goal 821 would assist in completing the parent goal 812.

(2) User assigns a goal. For example, this is shown with contributing goal 827. Even though the user does not own goal 827, the user is helping the owner by identifying who would be best to complete the goal.

(3) User adds goal and assigned goal. For example, this is shown with contributing goal 843. Although the user created goal 843, they did not assign it or link it with a parent goal. Another user has helped the user to connect the goal to parent goal 833 and assigned it to the user.

(4) User adds goal. For example, this is shown with goal 845. At this time, this is a standalone goal that does not have a parent or contributing goals.

In an implementation, the system allows departmental flexibility in establishing goals. For example, goals 821 and 843 are created by a single user. The user can be a member of department 1 or 2, or neither. The user can add goals to goal subtrees of two different departments (e.g., goal 821 and 843). The user can add a top-down link (812 to 823) or a bottom-up link (827 to 814).

FIGS. 9A-9F show user screens for different users in an organization. These users occupy different levels of the organization's organizational chart. Each screen represents what goals the system would present to each user for the organization's goal tree. For example, for a CEO of the organization, they can view goals that they have been assigned to. Here, the CEO has been assigned goals 1, 6, and 8. These goals can be created in the system by the CEO (goal 1) or others (goals 6 and 8). Employee 1 (or E1) created goal 8 and assigned the goal to CEO. This shows a bottom-up goal assignment, since employee 1 is lower in an organization structure than the CEO. The system also supports top down goal assignments. For example, for goal 2 CEO has assigned a goal to vice president 1 (VP1).

The system supports bottom-up and top-down goal assignments for one or more levels (e.g., one, two, three, four, or more levels difference) of separation (or difference) in an organization. For example, goals 4 and 8 show bottom up assignments. While goal 8 shows assignment from employee 1 to CEO (more than 1 level up in the organization's hierarchy), goal 4 shows an assignment from employee 1 to manager 1 (one level up only).

In an implementation, the system goals created by users in the system defaults to an open state. This means that the goals are visible by other users of the system. For example, a user can search goals of the system and the goals, whether they are assigned or created by the user, are returned in the search. In another example, a user can view other goals connected to a goal the user is assigned. When the user navigates to a system page with their goals, the system allows the user to see how other goals are related to their goal. This can include contributor or parent goals one, two, three, or more degrees of separation from the user's goal in a goal database of the system. Users can also search for users and see goals assigned to particular users in the system. For example, E1 (employee 1) can see CEO's page, and so forth.

Goal 16 is an example of a private goal. A user (e.g., E1) can create a private goal. In an implementation, the private goal is visible only by the user (e.g., E1) who created it. In another implementation, the private goal is visible by the user (e.g., E1) who created it and the immediate manager of the user (e.g., M1 who is the manager of E1). In another implementation, the private goal is visible by the user (e.g., E1) who created it and any users who are at a higher level in the organizational hierarchy.

Figure 10:
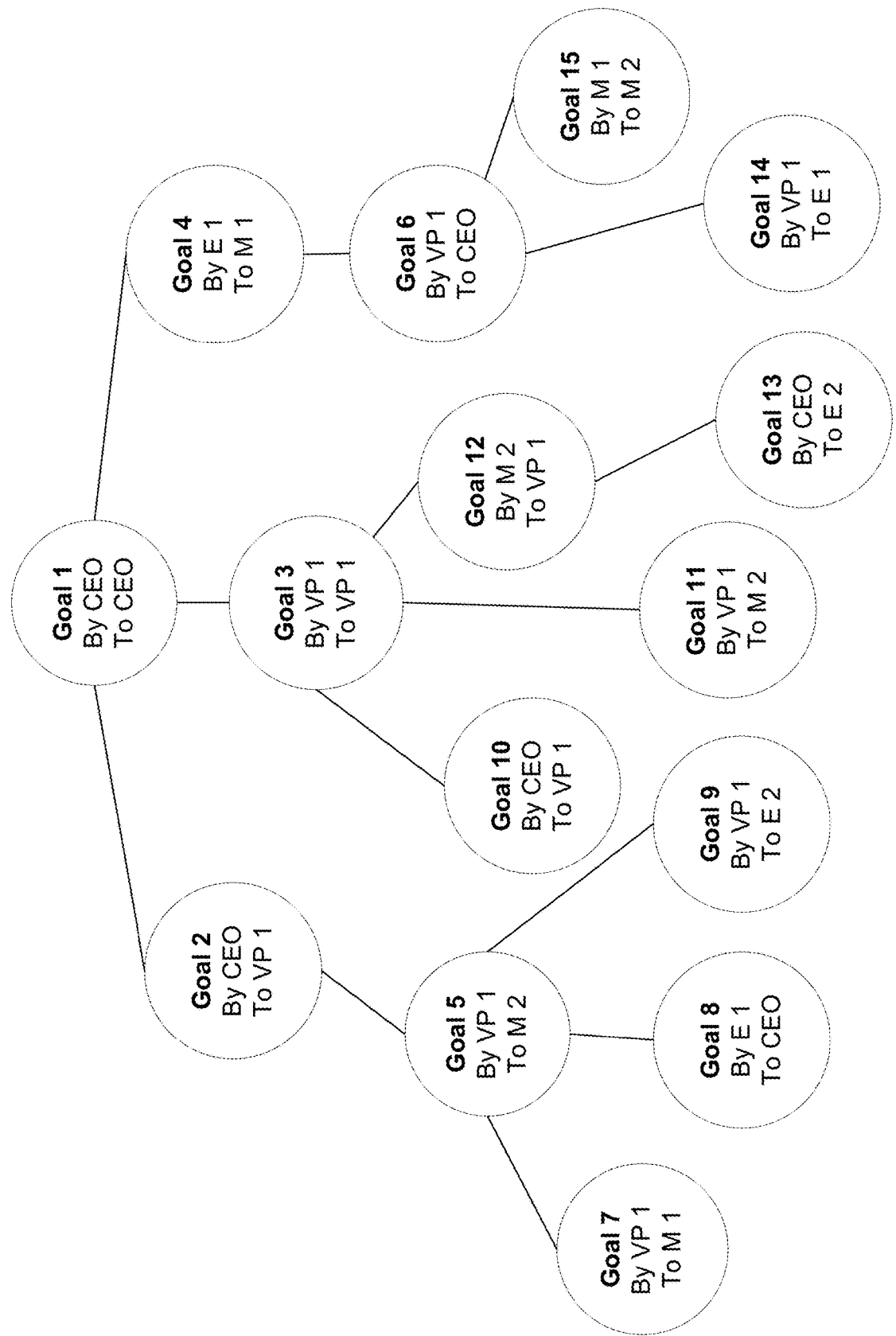
FIG. 10 shows a tree of the cascading goals are that are in the user screens of FIG. 9A-9F.

FIG. 10 shows a tree representing of the cascading goals represented in the user screens of FIGS. 9A-9F. In an implementation, the system restricts visibility of goals of an organization in tree format. For example, the system can provide views of goals in the system such as those in FIGS. 9A-9F, so that each user can access information relevant to their goals. This simplifies how users experience the system, so that only what is needed is visible to users. Users are generally allowed access to all the goals of an organization however, so if a user desires to do so, they can understand how their goals relate to parent goals in the system.

FIG. 10 also shows the flexible nature of goals in the system. For example, in atypical organization, goals will flow from those who occupy the upper portions of an organization chart downwards. An example of this is goal 2, where the chief executive officer of the organization delegates to a vice president of the organization. However, the system allows goals to flow in the reverse direction. As example of this is goal 8, where an employee has assigned a task to a chief executive officer.

Figure 11:
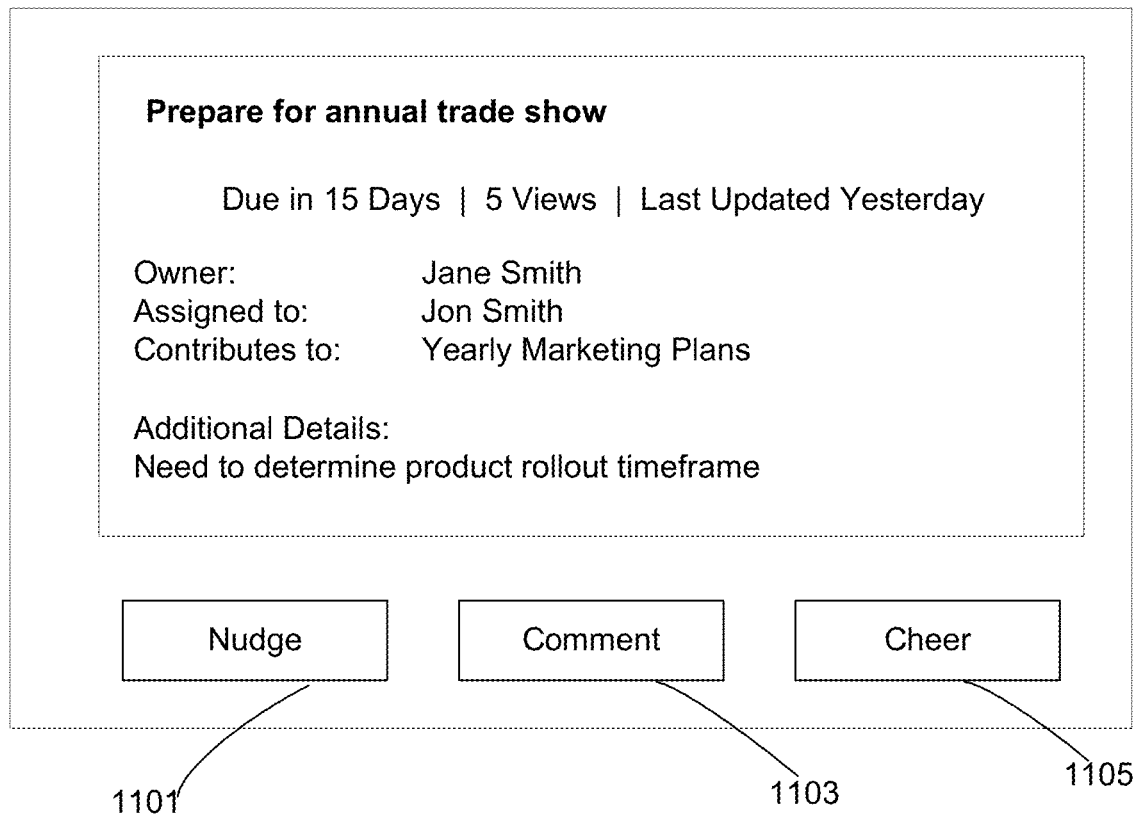
FIG. 11 shows an example of a goal page of the system with social features.

In an implementation, the system supports private goals. Private goals are goals created by users with only limited visibility to other users of the system, depending on the organization's structure. This is represented by goal 15, as shown in FIG. 11. Goal 15 is a goal created by employee 1. She can see this goal, since she is the one who created the goal. Usually, she would also be the person responsible for the completion of this goal. Other users of the system are not allowed to view this private goal, except for users who employee 1 reports directly to. In this organization, employee 1 directly reports to manager 1, who can view this private goal on their page. However manager 2, whom employee 1 does not report to, is not allowed to view this goal 15. Additionally, other users (e.g., CEO, VP, or employee 2) are also prevented from seeing goal 15. This is because they are more than one-degree of separation in this organization's structure. In another implementation, the system supports private goals that are visible to a selection of persons in an organization. The visibility can be user selected (e.g., the user selects a group or set of users of the organization) or system selected (e.g., the system determines the visibility of the goal by organization, historical information, or other method). For example, goals that a financial department is responsible for would appear for an engineer.

In an implementation, goal assignment acts as a lightweight workflow operation: a user can assign one or more pieces of their goal to another user. If the user assigns a piece of their goal to someone, and the recipient deletes the goal, ownership reverts back to the original assignor. The user can choose to reassign that reverted back goal to another user.

FIG. 11 shows an example of a goal page of the system with social features. This page is accessible to members of the organization, even if they are not included with this goal (e.g., not the owner or creator of this goal). The goal is to "Prepare for annual trade show." Various social features are included with the goal. For example, other users can nudge 1101, comment 1103, or cheer 1105 on goals of others or their own goals.

A nudge social feature provides an alert to other users of the system regarding this goal, including the user assigned the goal. The nudge can be used to let the person assigned the goal that they are falling behind.

A comment feature allows other user to make a comment regarding that goal. And all comments can be listed in a blog-style format for that goal, so users visiting the page can read the comments of others.

A cheer feature provides encouragement to other users of the system regarding this goal, including the user assigned the goal. The cheer can be used to let the person assigned the goal they are doing well and should keep up the good work. The cheer social feature can sometimes be referred to as a "like" button.

In an implementation, social features of the system include a cool-down period. This means that, once a user has used one of the social features, the user is disallowed from using the social feature again until a set amount of time has elapsed. For example, if a user cheers a goal, the user is prevented from immediately cheering the goal again. This helps prevent needless duplication of cheers or nudges and prevents accumulation of cheers and nudges in a short time period, so that continual progress is necessary to garner cheers or nudges.

Figure 12:
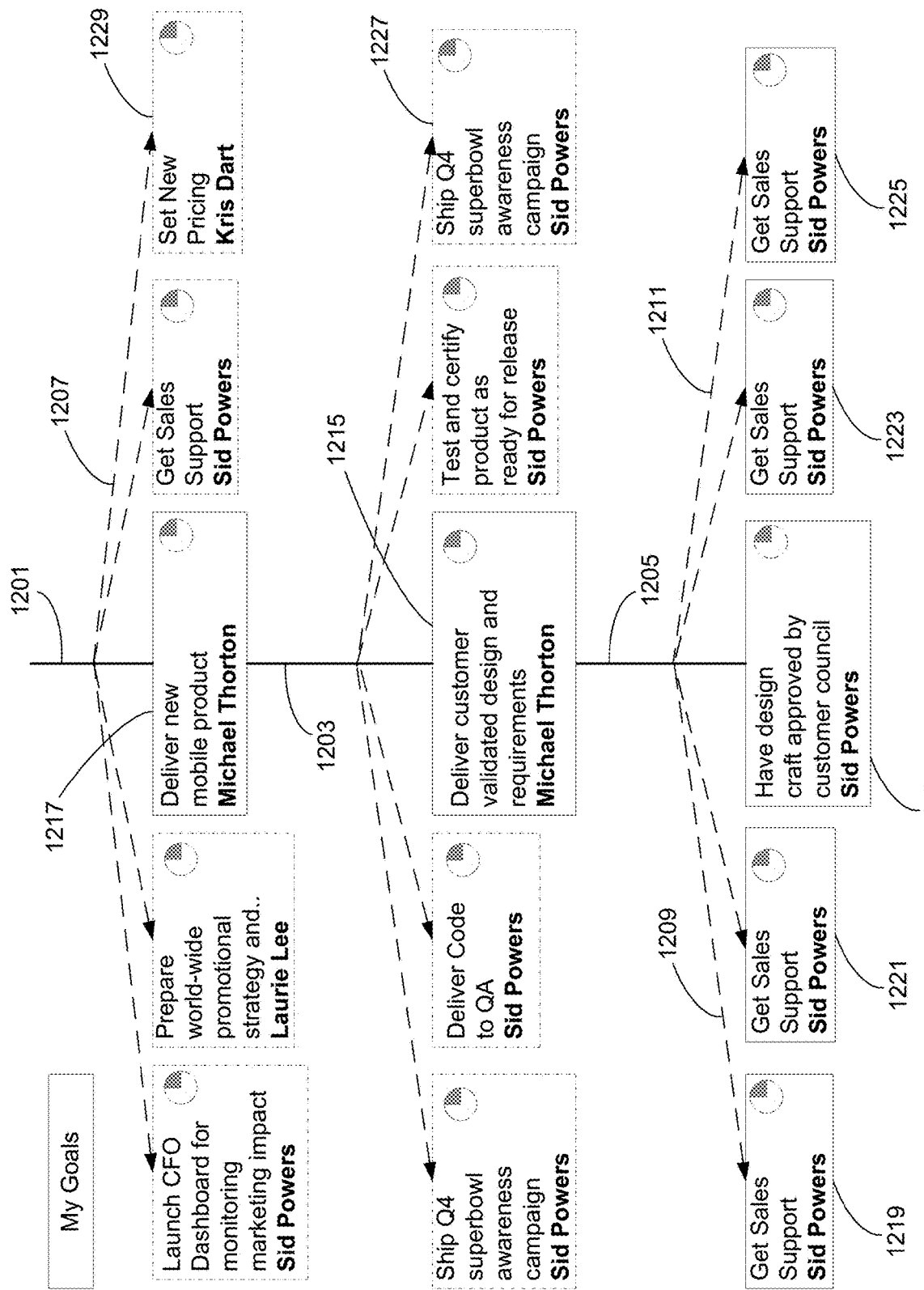
FIG. 12 shows a screen for a visualization showing the hierarchy of cascading tasks.

FIG. 12 shows a screen for a visualization showing the hierarchy of cascading tasks. This visualization would be shown on a computer screen for the user, to help the user understand how their goals fit in with the rest of their organization's goals. Solid lines (e.g., 1201, 1203, and 1205) represent goals directly related to a selected goal. Dotted lines (e.g., 1207, 1209, and 1211) represent goals indirectly related to the selected goal. For example, user Sid Powers can understand how his selected goal 1213 relates to the rest of the goals in the organization in this visualization. The system generates a visualization showing that goal 1213 has a parent goal 1213, which in turn has a parent goal of 1215, which in turn has a parent goal 1217. This allows Sid to see that how his goal 1213 contributes to goals one degree of separation from his goal (e.g., goal 1215) and even goals two or more degrees of separation from his goal (e.g., goal 1217). This includes goals assigned to persons different than Sid (e.g., Michael Thorton for goal 1215).

The visualization also shows Sid how goals on the same level or of different degrees of separation are in relation to his. For example, goals 1219, 1221, 1223, and 1225 are on the same level as the selected goal. This provides accountability for Sid, since he now knows that in order to complete goal 1215, which is the parent goal of goal 1213, he will need goals 1219, 1221, 1223, and 1225 to be completed as well. Further, Sid can see how goals one or more degrees of separation away such as goals 1227 and 1229 relate to his own. Although the selected goal 1213 is not directly connected to these goals (e.g., the selected goal is not a parent or child goal), completion of these goals will contribute to the overall success of the organization.

In another implementation, visualizations are used to show contributing (or subgoals) goals. For example, if a user selects a goal, the system creates a visualization showing all goals that contribute to the completion of that goal. The system also provides additional links allowing the user to select any of these subgoals, to see subgoals for the selected subgoal.

Figure 13:
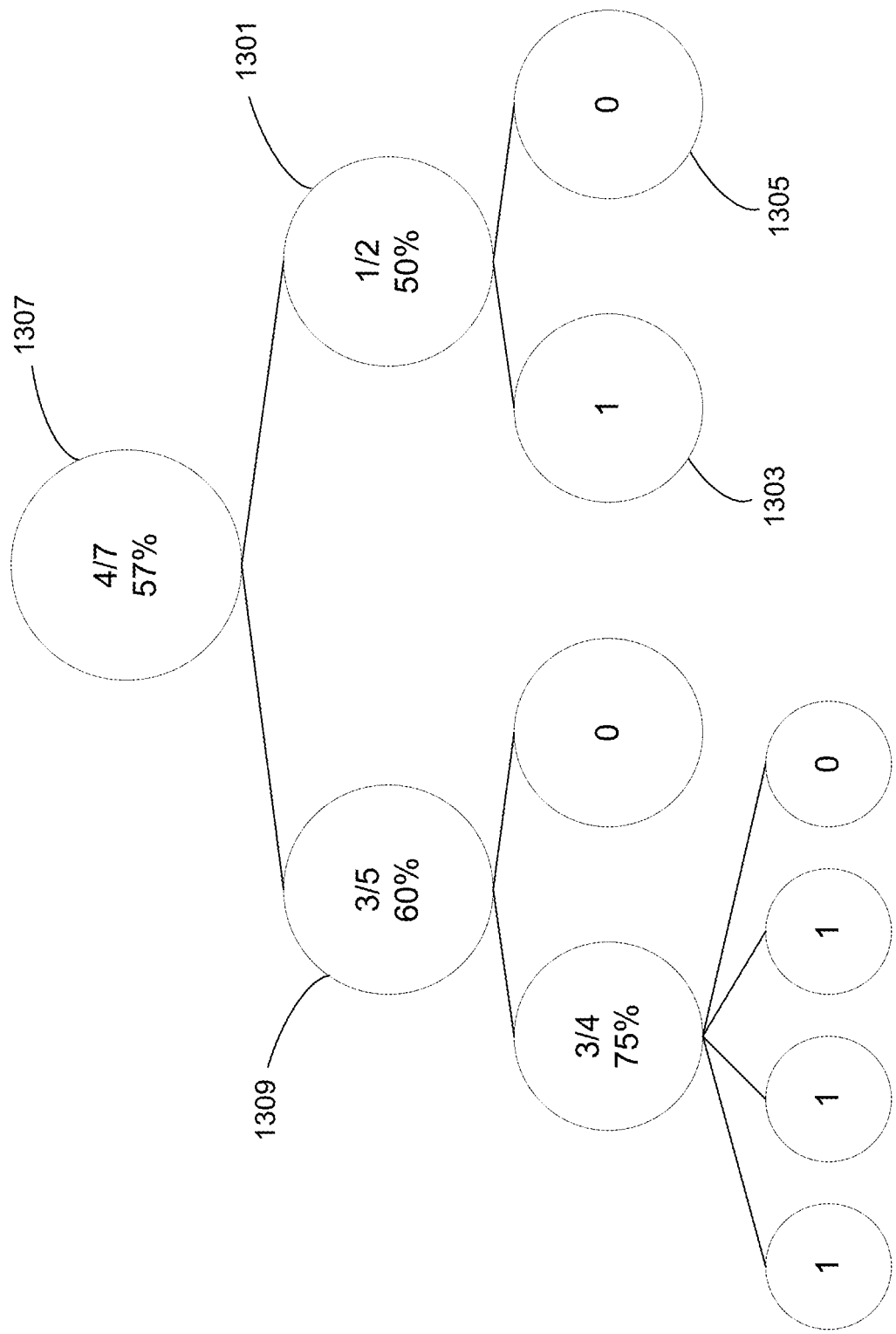
FIG. 13 shows a cascading goal tree for milestone goals.

FIG. 13 shows a cascading goal tree for milestone goals. All progress is properly calculated and rolled. Milestone goals that are completed are indicated by a "1," while milestone goals that are not yet completed are indicated by a "0." Indications of completion or noncompletion is analogous to a Boolean data type. Based on the milestones completed and not completed, the system calculates and determines the progress toward completion as indicated. For example, milestone goal 1301 is now fifty percent completed. This is because it includes two milestone items 1303 and 1305, where milestone item 1303 is completed and milestone item 1303 is not. As another example, goal 1307 is fifty-seven percent completed or 4 of 7 milestone items. This is because its milestone items are 1301 and 1309, where milestone item 1301 contains two milestone items and 1309 contains five milestone items. The progress toward completion can be represented as a percentage (as shown), or graphical in a timeline and line chart (e.g., indicating percentage of completion).

Figure 14:
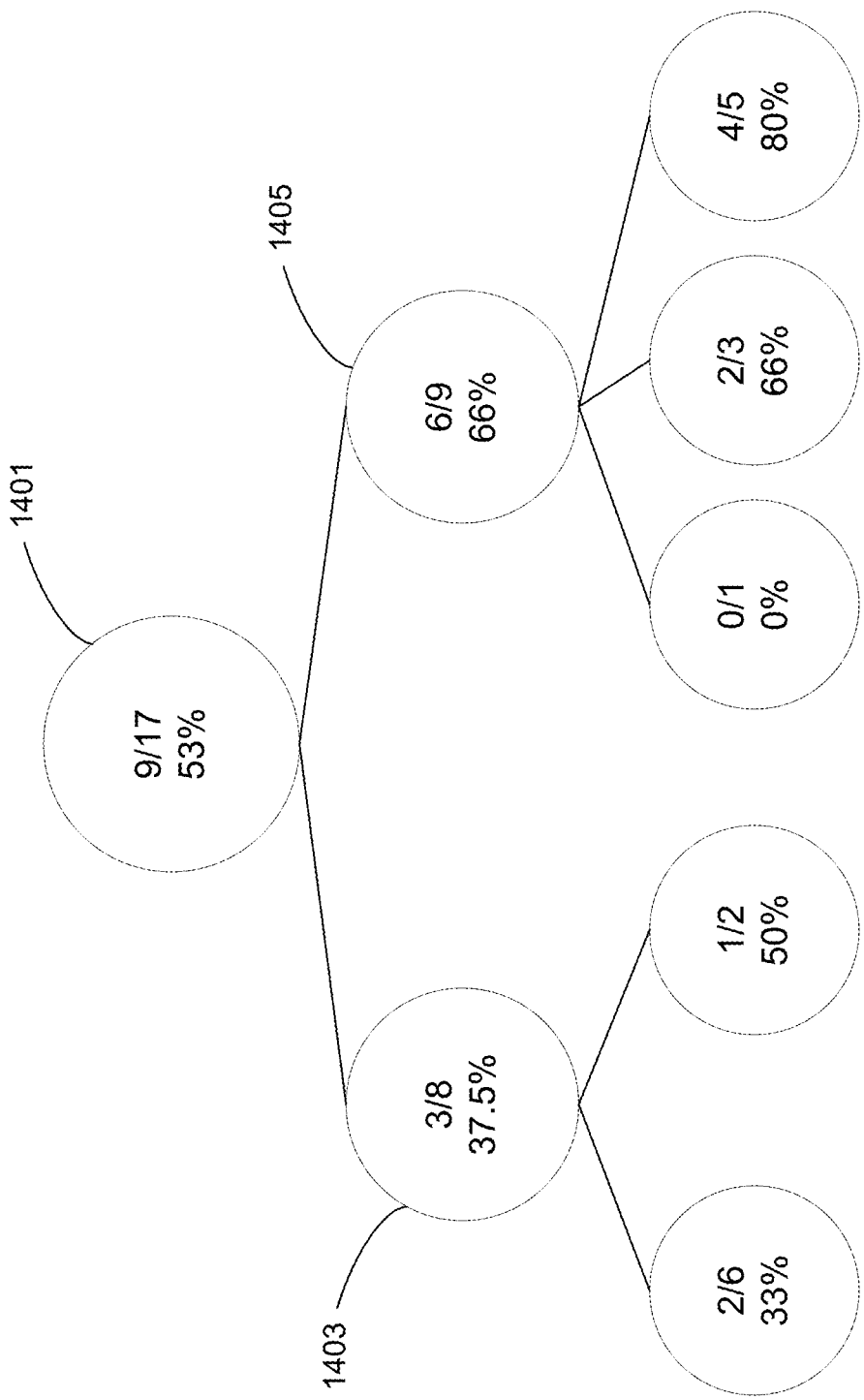
FIG. 14 shows a cascading goal tree for metric goals.

FIG. 14 shows a cascading goal tree for metric goals. All progress is properly calculated and rolled. As discussed, metric goals are quantitative. For example, a goal can have 6 metric items to complete, and when 2 of the 6 are completed, the percentage completion is 33 percent. Subgoals roll up to their parent goal and so forth. For example, metric goal 1401 includes metric items 1403 and 1405. Metric goal 1401 is fifty-three percent completed (or 9 of 17 items) since its metric items are three-eighths completed and six-ninth completed. This is automatically calculated by the system (e.g., by adding the number of completions and the number of total items). The progress toward completion can be represented as a percentage (as shown), or graphical in a timeline and line chart (e.g., indicating percentage of completion).

In an implementation, the system highlights roadblocks of completing goals to owners of each goal. The owner of a goal can see within a goal detail page or a goal chart visualization if a contributor is behind, by viewing their progress indicator. The progress indicator can use different colors to indicate different levels of progress with each goal (e.g., red for poor progress, yellow for potential issues, and green for good progress). Since goal inherit progress of any child goals, this will also indicate to the goal's owner if contributors are behind. In an implementation, the system includes a goals at risk dashboard, which points out goals that are blocking the top company goals from being completed.

In an implementation, milestone goals can have contributing metric goals. For example, a parent milestone goal can have a metric subgoal and milestone subgoals. In an implementation, metric goals do not have contributing milestone goals. But in further implementations, metric goals can have contributing milestone goals.

In an implementation, the system includes an animation or graphic with each goal, indicating the health of each goal. This provides an easy visual indication on the progress of a goal. For example, the graphic includes a tree in various stages of health. If the tree's associated goal is doing well, then the tree is shown in bloom (e.g., more branches, more leaves, brighter in color). However, if the tree's associated goal is doing poorly, then the tree is shown in various stages of poor health (e.g., bare tree, darker hued graphic). The health of a goal is determined by the time a user has last checked in with the goal. A check in is an action taken by an owner or person assigned to the goal to update the status or progress of the goal. Some examples of various actions that can be taken are posting a comment, marking a milestone item complete, updating a current value of completion, or any combination of these. To encourage frequent actions, the health of a goal decays with time. This amount of time is set by the system and correspond to different lengths of time (e.g., 3 days, 1 week, 2 weeks, or other length of time). In an implementation, only actions taken by a goal's owner is considered in determining the health of the goal. For example, if a person assigned to complete a goal performs an action on the goal, this information is not included in determining the health of the goal. This helps to make sure that people who create goals are frequently checking the health of their goals, encouraging proactive behavior in the goal's owner to complete the goal.

FIG. 15 shows an example flow 1501 for creating goals in a goal tracking system. In a step 1503, the system retrieves a hierarchical organization structure for a first organization. The hierarchical organization structure is generally unique to a specific organization and can include one or more positions (or levels) of employees in the structure. For example, companies can include positions for presidents, chief executive officers, vice presidents, secretaries, officers, managers, employees, or any combination of these positions. Each level or position includes one or more employees (or users). The organization structure defines how the people are interrelated and who reports to whom in the organization. A direct report for a person is someone who is one-level lower away and coupled in the organization structure. People can be more than one-level away in the organization structure, meaning that although they do not report directly to each other, the higher-level employee exercises indirect control over another (e.g., through intervening reports).

In a step 1505, the system receives a first request from a first user to create a first goal and assign to a second user. The first user specifies a person assigned to the first goal or optionally leaves it blank for later. In a step 1507, the system receives a second request from the second user to create a second goal and assign to the first user. The second user specifies a person assigned to the first goal or optionally leaves it blank for later. In a step 1509, the system determines that the first user is higher in the hierarchical organization structure of the first organization than the second user. This can mean that the first and second users are one, two, or more levels of separation in the organization structure. The system then saves first and second requests in a goals database of the system. The system disregards that the first user is higher in the hierarchical organization structure of the first organization than the second user. This allows the system to be flexible and allow a great degree of collaboration among persons of different levels in an organization to determine what goals are needed and how to best accomplish these goals.

FIG. 16 shows an example flow 1601 for generating reports in a goal tracking system. In a step 1603, the system determines to exclude the second goal from a report, based on the hierarchical organization structure. This means that the second user is a lower-level employee when compared to the first user based on the organization chart. For example, the report includes a section detailing the progress of goals for persons reporting to the second user. Since the first goal is assigned to a higher-level employee, this goal is not included in the second user's report. In an implementation, the second goal is a goal owned (or created) by the second user.

In a step 1605, the system determines to include the first goal in the report, based on the hierarchical organization structure. The second goal is included because the first goal is assigned to the second user. For example, the report includes a section detailing the progress of the second user's goal progress. The second goal would be included in this report. In a step 1607, the system presents the report to the second user. As discussed in greater detail elsewhere in this application, the report can be included as part of an e-mail summary, login screen, or other method for the second user.

In an implementation, the system includes a report generation feature. This feature can be accessible to all users or a subset of users (e.g., managers). This feature provides a system generated summary of how goals related to a user are progressing. This can be goals the user is assigned, goals created by the user, goals assigned to persons under their supervision (e.g., as specified in an organization's organization chart), or any combination of these. These reports are presented to users during login to a web site, login to an application, by an e-mail, by a manual request, or any combination of these. Table 1 includes an example of a goal progress report generated by the system.

TABLE 1

| Goal Progress Report |
|---|
| Team progress |
| Cheers You Gave 11 |
| Nudges You Gave 5 |
| Weekly Change 6% |
| Current Progress 57% |
| Team breakdown |

| | | |
|---|---|---|
| Tiya Tiyasirichokchai (11) | ^8% | 70% |
| Vincent Huang (10) | ^4% | 58% |
| Randall Horn (6) | ^5% | 55% |
| Erik Myers (11) | ^4% | 44% |
| Goals to check out | | |

| | | | |
|---|---|---|---|
| (1) Tiya Tiyasirichokchai | ^42% | 67% | Cheer |
| Image and file attachment capabilities in goal detail page | | | |
| (2) Tiya Tiyasirichokchai | ^32% | 88% | Cheer |
| Contribute 100 min towards Strengthen core values | | | |
| (3) Vincent Huang | 0% | 0% | Nudge |
| Instill Data Driven Decision Making | | | |
| (4) Erik Myers | 0% | −296% | Nudge |
| Goal Create on Charts Page | | | |
| Your current goals | | | |

| |
|---|
| (1) Contribute 750,000 Steps towards Q4: 101% |
| Viewed by 47     Cheered 14   Nudged 1 |
| (2) Q4 - Complete 30 User/Customer interviews: 82% |
| Viewed by 31     Cheered 14   Nudged 0 |
| (3) Q4 - Inspire Greatness Across the Company: 80% |
| Viewed by 23     Cheered 2   Nudged 1 |
| (4) Q4 - Deliver Partnerships and Integrations: 57% |
| Viewed by 18     Cheered 5   Nudged 0 |
| You also have 2 archived goals |

The report shown in table 1 includes four general categories: team progress, team breakdown, goals to check out, and your current goals. The team progress category includes an overview of progress made towards completing goals. Also, this category displays how many nudges or cheers the user has given to goals since the last report. This is an important feature since, especially for busy managers, this provides an easy way for managers to identify whether they have been proactive in offering praise or encouragement to employees.

The team breakdown category includes a breakdown of how each member that reports to the user has progressed with their goals. For example, team member Tiya has been assigned 11 goals in the system. For these goals, she has made eight percent progress, for a total of seventy percent completion of her goals.

The goals to checkout category includes a listing of specific goals assigned to persons managed by the user. The system analyzes goals assigned to persons the user is responsible for and identifies which need attention. For example, the system has identified the goal "Instill data drive decision making" assigned to Vincent as not showing any progress (e.g., zero percent). The system includes a link to a corresponding social feature to indicate more work needs to be done on this goal (e.g., a nudge) with the listing. On the other hand, the system has also identified a goal of "Contribute 100 min towards strengthen core values" as having had thirty-two percent progress for a total of eighty-eighty percent completion as showing a good deal of progress. The system includes a link to a corresponding social feature to indicate good progress and encouragement on this goal (e.g., a cheer) with the listing.

The "your current goals" category includes a listing of goals the user currently has in the system. Here, the user can view goals they are currently assigned to, as well as how they are doing with the goal. For example, for goal "Q4—Engagement Metrics," the goal is fifty-six percent complete. It has been viewed by twenty-eight users of the system, cheered by one user, and nudged by one user.

In an implementation, cascading goals are implemented in a directed graph using parent-child relationships. For example, goals in the system are stored in a database (queried using SQL or other database formats). In the database, each goal is represented as a row and references its parent (using a parent_id tag). Goal's children can be acquired by doing a reverse lookup on the parent. Table 2 shows sample pseudocode to implement goals in the system.

TABLE 2

Sample Pseudocode

```
class Goal
{
  def progress( )
    return (current - initial)/(target - initial)
  # attach this goal to parent
  def attach(parent)
    # Milestone Goals can have metric goal as children but metric goals cannot have child milestone goals.
      if type(parent) == MetricGoal and type(this) == MilestoneGoal
        raise Exception
      this.parent_id = parent.id
      parent.update_current( )
}
class MetricGoal extends Goal
{
  def update_current( )
    current = this.owner_current
    for child in this.children
      current += child.current
    this.current = current
    if this.parent
      this.parent.update_current( )
}
class MilestoneGoal extends Goal
{
  def update_current( )
    current = 0
    for milestone in this.milestones
      # if milestone has a goal associated, use the underlying goal's progress
```

TABLE 2-continued

Sample Pseudocode

```
      if milestone.goal
        current += milestone.goal.progress( )
      else:
        # if milestone has no goal associated, completion is binary
        if milestone.done
          current += 1
    self.current = current
    if this.parent
      this.parent.update_current( )
}
```

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of presenting a user interface comprising:
retrieving, from a database associated with an organization, data representing a hierarchical organization structure of the organization, the hierarchical organization structure comprising one or more users associated with the organization;
receiving, over a network and from a first user device of a first user of the one or more users associated with the organization, data representing a goal, the data designating an assignee of the goal, wherein the assignee of the goal is a second user of the one or more users associated with the organization;
modifying a goal tree associated with the organization to include the goal;
determining, based at least in part on a first device type of the first user device, a first format of the user interface to be displayed by the first user device, wherein the first format comprises at least a first portion of the goal tree, wherein the at least the first portion of the goal tree to be displayed by the first user device is determined based at least in part on at least one of i) a first relevance of the data representing the goal to the first user and ii) a first level in the hierarchical organization structure associated with the first user;
determining, based at least in part on a second device type of a second user device of the second user, a second format of the user interface to be displayed by the second user device, wherein the second format comprises at least a second portion of the goal tree, wherein the at least the second portion of the goal tree to be displayed by the second user device is determined based at least in part on at least one of iii) a second relevance of the data representing the goal to the second user and iv) a second level in the hierarchical organization structure associated with the second user, the second level being different than the first level; and
generating a dashboard to be displayed by the first user device or the second user device, the dashboard indicating:
one or more child goals of the goal that is preventing the goal from being completed; and
a social component enabling a cheer for the goal.

2. The method of claim 1, wherein:
the goal comprises a first goal,
the goal tree includes a second goal that is allowed to be displayed on the first user device, and
the at least the first portion of the goal tree to be displayed by the first user device includes the second goal.

3. The method of claim 2, wherein:
the second goal is not allowed to be displayed on any user device aside from the first user device, and
the at least the second portion of the goal tree to be displayed by the second user device does not include the second goal.

4. The method of claim 1, further comprising receiving a request from at least one of the first user or the second user to modify the assignee of the goal to a third user of the one or more users associated with the organization.

5. The method of claim 4, further comprising determining, based at least in part on a third device type of a third user device of the first user, a third format of the user interface to be displayed by the third user device of the first user, wherein the third format comprises at least a third portion of the goal tree.

6. The method of claim 5, wherein determining the third format of the user interface is further based at least in part on the modified assignee of the goal.

7. The method of claim 1, further comprising determining that the first level associated with the first user is more than one level lower in the hierarchical organization structure of the organization than the second level associated with the second user,
wherein the at least the first portion of the goal tree to be displayed by the first user device is determined further based at least in part on the first level being determined to be more than one level lower than the second level associated with the second user.

8. The method of claim 1, further comprising:
receiving, over the network and from the second user device of the second user, second data representing a second goal, the second data designating a second assignee of the second goal, wherein the second assignee of the second goal is the first user; and
modifying the goal tree associated with the organization to include the second goal.

9. The method of claim 1, wherein the goal is a milestone type goal, including at least two milestone items, and each milestone item being required to be completed before the goal is completed.

10. The method of claim 1, wherein the goal is a metric type goal, including a numerical value and unit type, and the numerical value needing to be met before the goal is completed.

11. A system for presenting a user interface comprising:
one or more processors; and
one or more computer readable media storing instructions that, when executed by the one or more processors, cause the one or more processors to perform acts comprising:
receiving, from a human resource database of an organization, data representing a hierarchical organization structure of the organization;
receiving, over a network and via a user interface component, a computer transmission from a first user associated with the organization, the computer transmission comprising data indicating a goal and designating an assignee of the goal, wherein the assignee of the goal corresponds to a second user;
generating, based at least in part on the hierarchical organization structure of the organization and based at least in part on receiving the goal, a goal tree associated with the organization, wherein the goal tree comprises the goal;
determining, based at least in part on a device of the first user, a specific format of user interface, wherein the specific format of the user interface comprises at least a portion of the goal tree associated with the organization, wherein the at least the portion of the goal tree is determined based at least in part on at least one of i) a relevance of the data indicating the goal to the first user and ii) a level in the hierarchical organization structure associated with the first user;
generating a dashboard indicating one or more child goals of the goal that is preventing the goal from being completed and a social component enabling a cheer for the goal; and
sending, over the network and to the device of the first user, the user interface in the specific format and the dashboard.

12. The system of claim 11, wherein the instructions further program the one or more processors to perform acts comprising:
generating, by a reporting component coupled to the user interface component and based at least in part on the level of the first user, one or more reports for the first user; and
sending, over the network and to the device of the first user, the one or more reports.

13. The system of claim 11, wherein the goal is a milestone type goal, including at least two milestone items which are required to be completed before the goal is completed.

14. The system of claim 11, wherein the goal is a metric type goal, including a numerical value and unit type, the numerical value needing to be met before the goal is completed.

15. The system of claim 11, wherein the social component provides a selectable indicator that, when selected by the first user, provides feedback regarding progress towards accomplishing the goal.

16. The system of claim 15, wherein the social component further provides the selectable indicator that, when selected by the second user, provides the feedback regarding progress towards accomplishing the goal.

17. The system of claim 11, wherein the goal comprises a first goal and the instructions further program the one or more processors to perform acts comprising:
receiving, over the network and via the user interface component, a second computer transmission from the second user, the second computer transmission comprising second data indicating a second goal and designating a second assignee of the second goal, wherein the second assignee of the second goal corresponds to the first user;
generating an updated goal tree associated with the organization, wherein the updated goal tree comprises the first goal and the second goal;
determining a second format of the user interface, wherein the second format of the user interface comprises at least a portion of the goal tree;
sending, to the device of the first user, the user interface in the specific format; and
sending, to a second device of the second user, the user interface in the second format.

18. The system of claim 11, wherein the instructions further program the one or more processors to receive modification of the assignee of the goal from at least one of the device of the first user or a second device of the second user.

19. The system of claim 18, wherein the at least the portion of the goal tree is a first portion of the goal tree, and wherein the instructions further program the one or more processors to determine a second format of the user interface, wherein the second format comprises at least a second portion of the goal tree.

20. The system of claim 19, wherein:
the level comprises a first level;
the second format of the user interface is determined further based at least in part on a second level in the hierarchical organization structure of the organization associated with a third user;
the first level is determined to be more than one level lower in the hierarchical organization structure of the organization than the second level associated with the third user; and
the at least the portion of the goal tree is determined further based at least in part on the first level being determined to be more than one level lower than the second level associated with the third user.

* * * * *